US012638126B2

(12) United States Patent
Xu et al.

(10) Patent No.: US 12,638,126 B2
(45) Date of Patent: May 26, 2026

(54) DISPLAY MOUNTING SUPPORT

(71) Applicant: Xinadda (Hong Kong) Limited, Hong Kong (CN)

(72) Inventors: Hao Xu, Hong Kong (CN); Linghui Wu, Hong Kong (CN)

(73) Assignee: Xinadda (Hong Kong) Limited, Hong Kong (CN)

( * ) Notice: Subject to any disclaimer, the term of this patent is extended or adjusted under 35 U.S.C. 154(b) by 214 days.

(21) Appl. No.: 18/594,447

(22) Filed: Mar. 4, 2024

(65) Prior Publication Data

US 2025/0243962 A1      Jul. 31, 2025

(30) Foreign Application Priority Data

Jan. 30, 2024      (CN) .......................... 202420226647.5

(51) Int. Cl.
| | |
|---|---|
| *F16M 11/04* | (2006.01) |
| *F16M 11/08* | (2006.01) |
| *F16M 11/20* | (2006.01) |

(52) U.S. Cl.
CPC ......... *F16M 11/041* (2013.01); *F16M 11/048* (2013.01); *F16M 11/08* (2013.01); *F16M 11/2021* (2013.01)

(58) Field of Classification Search
CPC ... F16M 11/041; F16M 11/10; F16M 11/2021
See application file for complete search history.

(56) References Cited

U.S. PATENT DOCUMENTS

| | | | | |
|---|---|---|---|---|
| 6,863,252 B2 * | 3/2005 | Bosson | ................ | F16M 11/041 |
| | | | | 248/278.1 |
| 7,380,760 B2 * | 6/2008 | Dittmer | ................ | F16M 11/041 |
| | | | | 248/278.1 |
| 8,342,462 B2 * | 1/2013 | Sapper | ................... | F16M 11/24 |
| | | | | 248/920 |
| 8,693,172 B2 * | 4/2014 | Russell | .............. | F16M 11/2085 |
| | | | | 361/679.01 |
| 10,010,177 B1 * | 7/2018 | Pei | ......................... | F16M 13/02 |
| 10,563,811 B2 * | 2/2020 | Pei | ..................... | F16M 11/2085 |
| 10,851,938 B2 * | 12/2020 | Glickstein | ............ | F16M 13/022 |
| 11,215,313 B1 * | 1/2022 | Beil | .................... | F16M 11/2014 |
| 12,163,621 B2 * | 12/2024 | Xu | ......................... | F16M 13/02 |
| 12,404,966 B2 * | 9/2025 | Xu | ........................ | F16M 11/046 |

(Continued)

*Primary Examiner* — Bradley Duckworth
(74) *Attorney, Agent, or Firm* — IP Spring

(57) ABSTRACT

The present disclosure provides a display mounting support, including a wall plate, a connecting arm, a tilt adjustment assembly, and a mounting frame. The connecting arm is connected between the wall plate and the tilt adjustment assembly, and the tilt adjustment assembly is connected to the mounting frame. The tilt adjustment assembly is configured for mounting a display screen. The tilt adjustment assembly includes a first mounting bracket, a second mounting bracket and a locking member. The first mounting bracket is rotatably connected to the connecting arm. The second mounting bracket is connected to the mounting frame. The locking member is connected between the first mounting bracket and the second mounting bracket. A rotating angle of the locking member for locking the first mounting bracket to the second mounting bracket is less than or equal to 180 degrees.

20 Claims, 19 Drawing Sheets

1

(56) References Cited

U.S. PATENT DOCUMENTS

| | | | |
|---|---|---|---|
| 2007/0041150 A1* | 2/2007 | Short | F16M 11/2014 |
| | | | 361/679.22 |
| 2009/0052128 A1* | 2/2009 | Yeh | F16M 11/041 |
| | | | 361/679.27 |
| 2020/0355315 A1* | 11/2020 | Huang | F16M 11/16 |
| 2021/0059413 A1* | 3/2021 | Pei | F16M 11/10 |
| 2025/0172232 A1* | 5/2025 | Xu | F16M 11/10 |
| 2025/0207717 A1* | 6/2025 | Ozkan | F16M 11/041 |
| 2025/0221531 A1* | 7/2025 | Maves | A47B 97/001 |

* cited by examiner

DISPLAY MOUNTING SUPPORT

CROSS-REFERENCE TO RELATED APPLICATIONS

This application claims priority under 35 U.S.C., § 119(a) to and the benefit of Chinese Application Patent Application 202420226647.5, filed Jan. 30, 2024, the entire disclosure of which is hereby incorporated by reference.

TECHNICAL FIELD

The present disclosure relates to a technical field of display mounts, and in particular relates to a display mounting support.

BACKGROUND

Currently, in order to save space, the display screen generally needs to be hung on a wall by means of a hanger. However, the existing hangers are difficult to operate when being mounted on the wall, and the mounting process is time-consuming, which brings inconvenience to the user.

SUMMARY

In view of this, the present disclosure proposes a display mounting support, to simplify a mounting process of the display mounting support, and reduce a mounting time duration, so as to solve the above technical problems.

In a first aspect, the present disclosure provides a display mounting support. The display mounting support includes a wall plate, a connecting arm, a tilt adjustment assembly, and a mounting frame. The connecting arm is connected between the wall plate and one side of the tilt adjustment assembly, and the other side of the tilt adjustment assembly is connected to the mounting frame. One side of the mounting frame away from the tilt adjustment assembly is configured for mounting a display screen. The tilt adjustment assembly includes a first mounting bracket, a second mounting bracket and a locking member. The first mounting bracket is rotatably connected to the connecting arm. The second mounting bracket is connected to the mounting frame. The locking member is connected between the first mounting bracket and the second mounting bracket. Rotating the second mounting bracket relative to the first mounting bracket is capable of adjusting a pitch tilt angle of the second mounting bracket relative to the first mounting bracket. Rotating the locking member is capable of locking the first mounting bracket to the second mounting bracket, and a rotating angle of the locking member for locking the first mounting bracket to the second mounting bracket is less than or equal to 180 degrees.

A second aspect of the present disclosure provides a display mounting support. The display mounting support includes a wall plate, a connecting arm, a tilt adjustment assembly, and a mounting frame. The connecting arm is connected between the wall plate and one side of the tilt adjustment assembly, and the other side of the tilt adjustment assembly is connected to the mounting frame. One side of the mounting frame away from the tilt adjustment assembly is configured for mounting a display screen. The tilt adjustment assembly includes a first mounting bracket, a second mounting bracket and a locking member. The first mounting bracket is rotatably connected to the connecting arm. The second mounting bracket is connected to the mounting frame. The locking member is connected between the first mounting bracket and the second mounting bracket. Rotating the second mounting bracket relative to the first mounting bracket is capable of adjusting a pitch tilt angle of the second mounting bracket relative to the first mounting bracket. Rotating the locking member is capable of locking the first mounting bracket to the second mounting bracket. The second mounting bracket further includes a second bracket body. The display mounting support further includes a hook and a connecting member both located on a side of the mounting frame facing the connecting arm. The hook is suspended on a top end of the second bracket body. The connecting member is connected to a bottom end of the second bracket body. The connecting member includes a safety member, an elastic member and a sliding seat. The sliding seat is connected to the mounting frame. One side of the sliding seat facing the mounting frame is recessed to form an up-down sliding space. The safety member is inserted into the sliding space. One end of the elastic member is connected to the sliding seat and the other end of the elastic member is connected to the safety member. A top end of the safety member forms a hook portion for engaging with the bottom end of the second bracket body.

Therefore, the locking member is connected between the first mounting bracket and the second mounting bracket, the rotational movement of the second mounting bracket relative to the first mounting bracket is capable of adjusting the pitch tilt angle of the second mounting bracket relative to the first mounting bracket, and the rotating angle of the locking member for locking the first mounting bracket to the second mounting bracket is less than or equal to 180 degrees, which can realize fast locking and can simplify a mounting process and reduce a mounting time duration of the display mounting support compared to the locking member of the prior art which needs to be rotated many turns during locking. The second mounting bracket further includes a second bracket body; the display mounting support further includes a hook and a connecting member both located on a side of the mounting frame facing the connecting arm; the hook is suspended on a top end of the second bracket body; the connecting member is connected to a bottom end of the second bracket body; the connecting member includes a safety member, an elastic member and a sliding seat; the sliding seat is connected to the mounting frame; one side of the sliding seat facing the mounting frame is recessed to form an up-down sliding space; the safety member is inserted into the sliding space; one end of the elastic member is connected to the sliding seat and the other end of the elastic member is connected to the safety member; a top end of the safety member forms a hook portion for engaging with the bottom end of the second bracket body. Therefore, quick mounting is possible without screw locking. This simplifies the mounting process and reduces the mounting time duration of the display mounting support.

BRIEF DESCRIPTION OF THE ACCOMPANYING DRAWINGS

To describe the technology solutions in the embodiments of the present disclosure more clearly, the following briefly introduces the accompanying drawings required for describing the embodiments. Obviously, the accompanying drawings in the following description show merely at least one embodiment of the present disclosure, those of ordinary skilled in the art may also obtain other drawings based on these drawings without any creative efforts.

DETAILED DESCRIPTION OF ILLUSTRATED EMBODIMENTS

Embodiments of the present disclosure are described in detail below. Examples of the embodiments are shown in the accompanying drawings. The same or similar labeling throughout denotes the same or similar elements or elements having the same or similar functions. The embodiments described below by reference to the accompanying drawings are exemplary and are intended to be configured to explain the present disclosure and are not to be construed as limiting the present disclosure.

Furthermore, the terms "first" and "second" are used for descriptive purposes only and are not to be understood as indicating or implying relative importance or implicitly specifying the number of technical features indicated. Therefore, a feature defined with "first" or "second" may include one or more such features, either explicitly or implicitly. In the description of the present disclosure, "more than one" means two or more, unless otherwise expressly and specifically limited.

In the present disclosure, unless otherwise expressly specified and limited, the terms "connected", "fixed", and so on are to be understood broadly, e.g., they may be fixedly connected, removably connected, or integrally connected; they may be mechanically connected or electrically connected; they may be directly connected or indirectly connected through an intermediate medium; they may be interconnected within two elements or an interactive relationship between two elements. For those of ordinary skill in the art, the specific meaning of the above terms in the present disclosure may be understood on a case-by-case basis.

Figure 1:
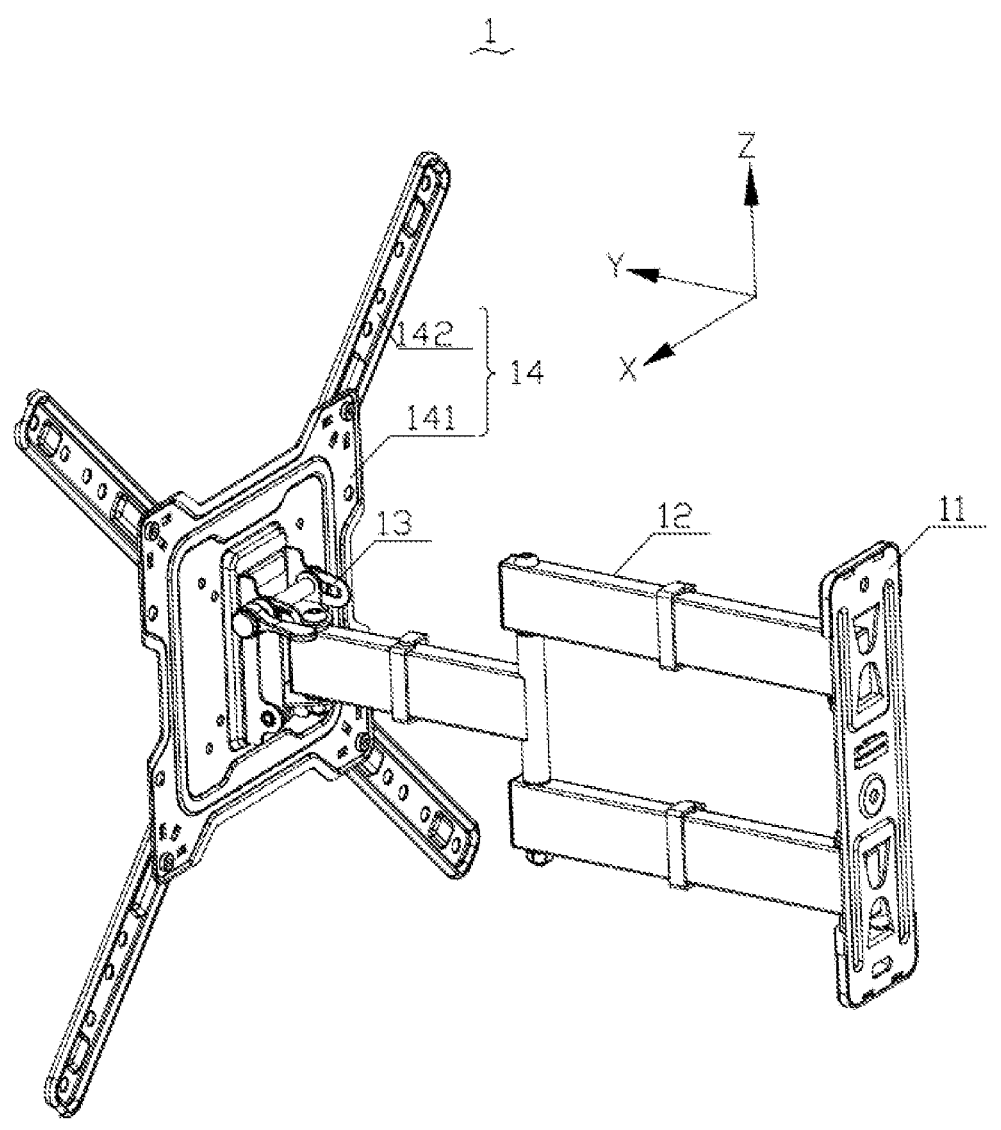
FIG. 1 illustrates a schematic view of a three-dimensional structure of a display mounting support in according with one embodiment of the present disclosure.
Figure 2:
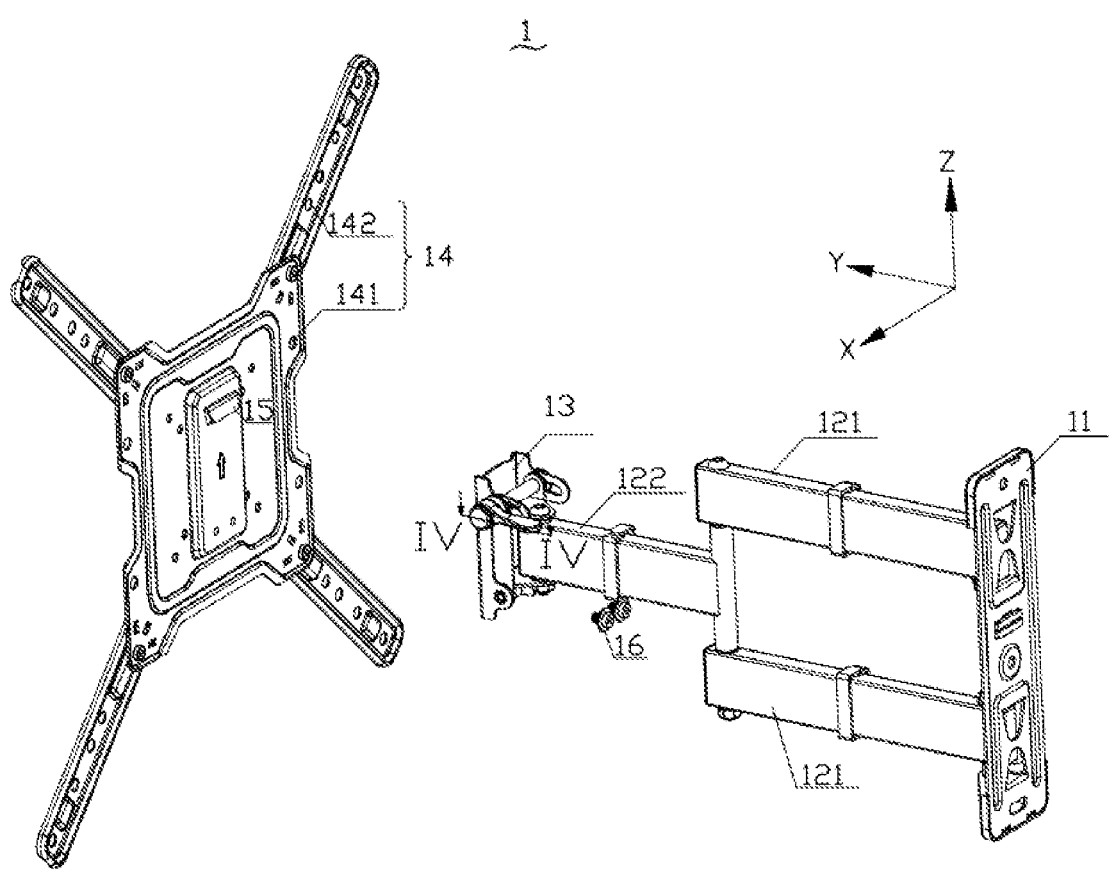
FIG. 2 illustrates a partial exploded view of FIG. 1.

Referring to FIGS. 1 and 2, FIG. 1 illustrates a schematic view of a three-dimensional structure of a display mounting support in according with one embodiment of the present disclosure; FIG. 2 illustrates a partial exploded view of FIG. 1.

For convenience of description, a front-back direction of the display mounting support 1 shown in FIG. 1 is defined as a Y-axis direction, a left-right direction of the display mounting support 1 shown in FIG. 1 is defined as an X-axis direction, and a height direction of the display mounting support 1 shown in FIG. 1 is defined as a Z-axis direction. The orientation terms such as "top", "bottom", "left", "right", "front", and "back" mentioned in the description of the display mounting support 1 in the embodiments of the present disclosure are based on the orientation shown in FIG. 1 of the accompanying drawings of the specification, with a positive direction of Z-axis as the "top", a negative direction of Z-axis as the "bottom", a negative direction of X-axis as the "left" and a positive direction of the X-axis as "right", a positive direction of Y-axis as the "front" and a negative direction of the Y-axis as "back", which does not constitute a limitation of the display mounting support 1 in an actual application scenario.

Figure 3:
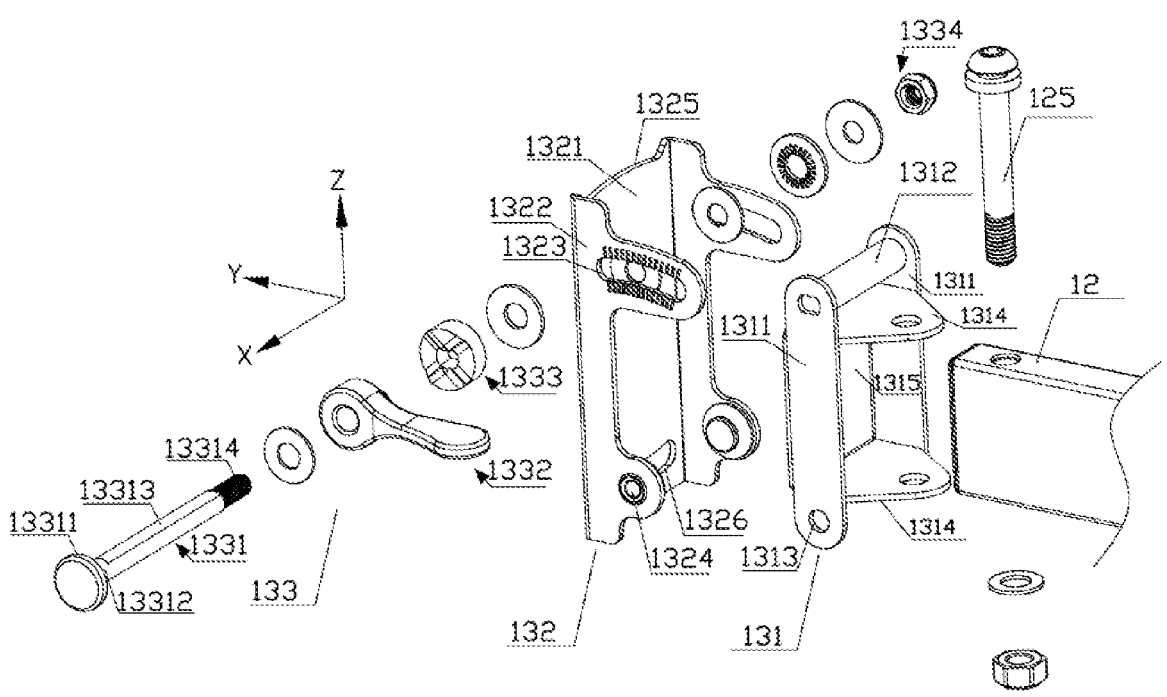
FIG. 3 illustrates an exploded view of a wall plate, a connecting arm and a tilt adjustment assembly of FIG. 2.

As shown in FIGS. 1 and 2, the display mounting support 1 includes a wall plate 11, a connecting arm 12, a tilt adjustment assembly 13 and a mounting frame 14. The connecting arm 12 is connected between the wall plate 11 and one side of the tilt adjustment assembly 13. The other side of the tilt adjustment assembly 13 is connected to the mounting frame 14. One side of the mounting frame 14 away from the tilt adjustment assembly 13 is configured for mounting a display screen. Referring to FIG. 3, FIG. 3 illustrates an exploded view of a wall plate 11, a connecting arm 12 and a tilt adjustment assembly 13 of FIG. 2. The tilt adjustment assembly 13 includes a first mounting bracket 131, a second mounting bracket 132 and a locking member 133. The first mounting bracket 131 is rotatably connected to the connecting arm 12. The second mounting bracket 132 is connected to the mounting frame 14. The locking member 133 is connected between the first mounting bracket 131 and the second mounting bracket 132. Rotating the second mounting bracket 132 relative to the first mounting bracket 131 can adjust a pitch tilt angle of the second mounting bracket 132 relative to the first mounting bracket 131. Rotating the locking member 133 can lock the first mounting bracket 131 to the second mounting bracket 132, and a rotating angle of the locking member 133 for locking the first mounting bracket 131 to the second mounting bracket 132 is less than or equal to 180 degrees.

Therefore, the locking member 133 is connected between the first mounting bracket 131 and the second mounting bracket 132, the rotational movement of the second mounting bracket 132 relative to the first mounting bracket 131 is capable of adjusting the pitch tilt angle of the second mounting bracket 132 relative to the first mounting bracket 131, and the rotating angle of the locking member 133 for locking the first mounting bracket 131 to the second mounting bracket 132 is less than or equal to 180 degrees, which can realize fast locking and can simplify the mounting process and reduce the mounting time duration of the display mounting support 1 compared to the locking member of the prior art which needs to be rotated many turns during locking.

Figure 4:
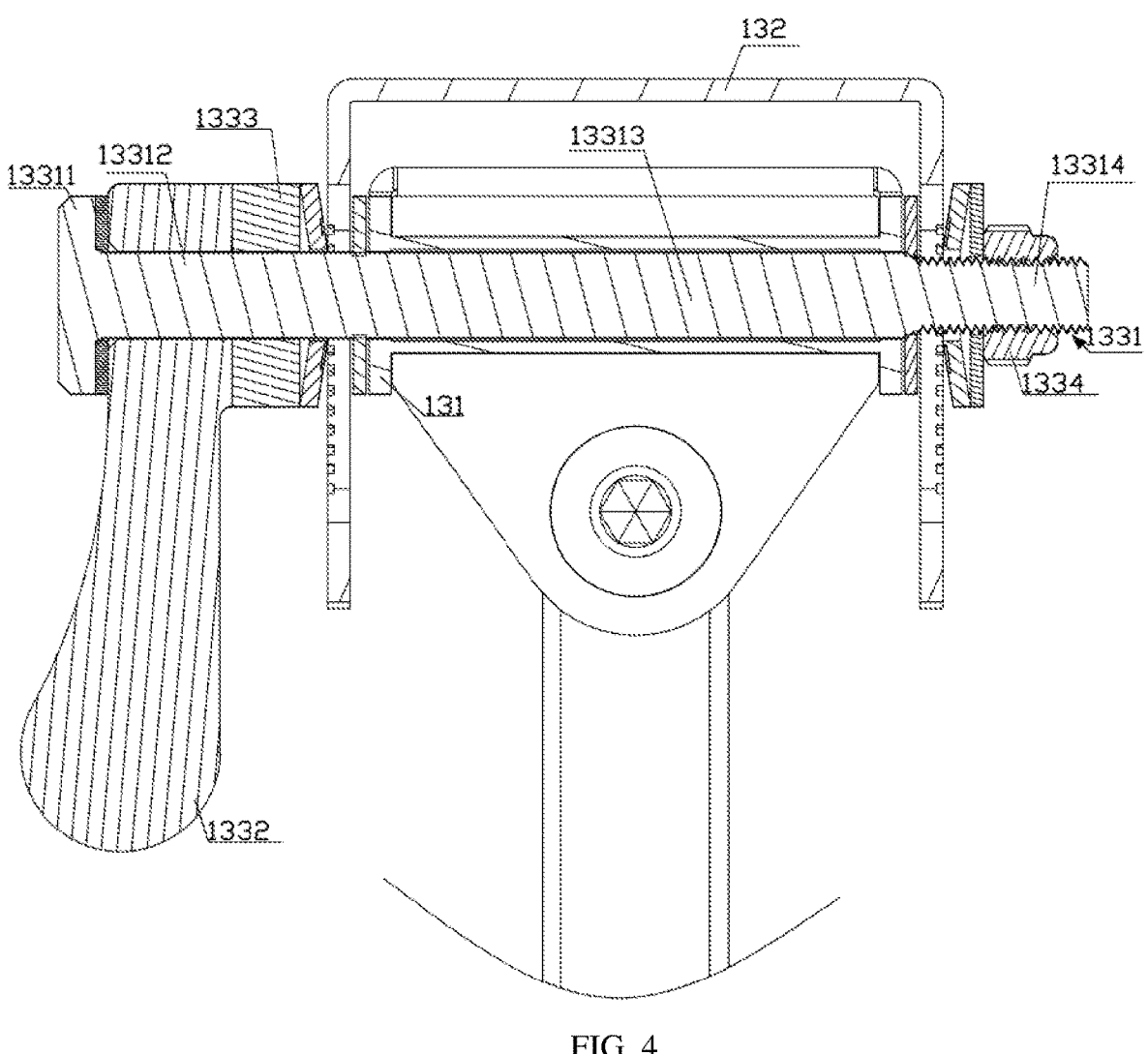
FIG. 4 illustrates a cross-sectional view of FIG. 2 at IV.
Figure 5:
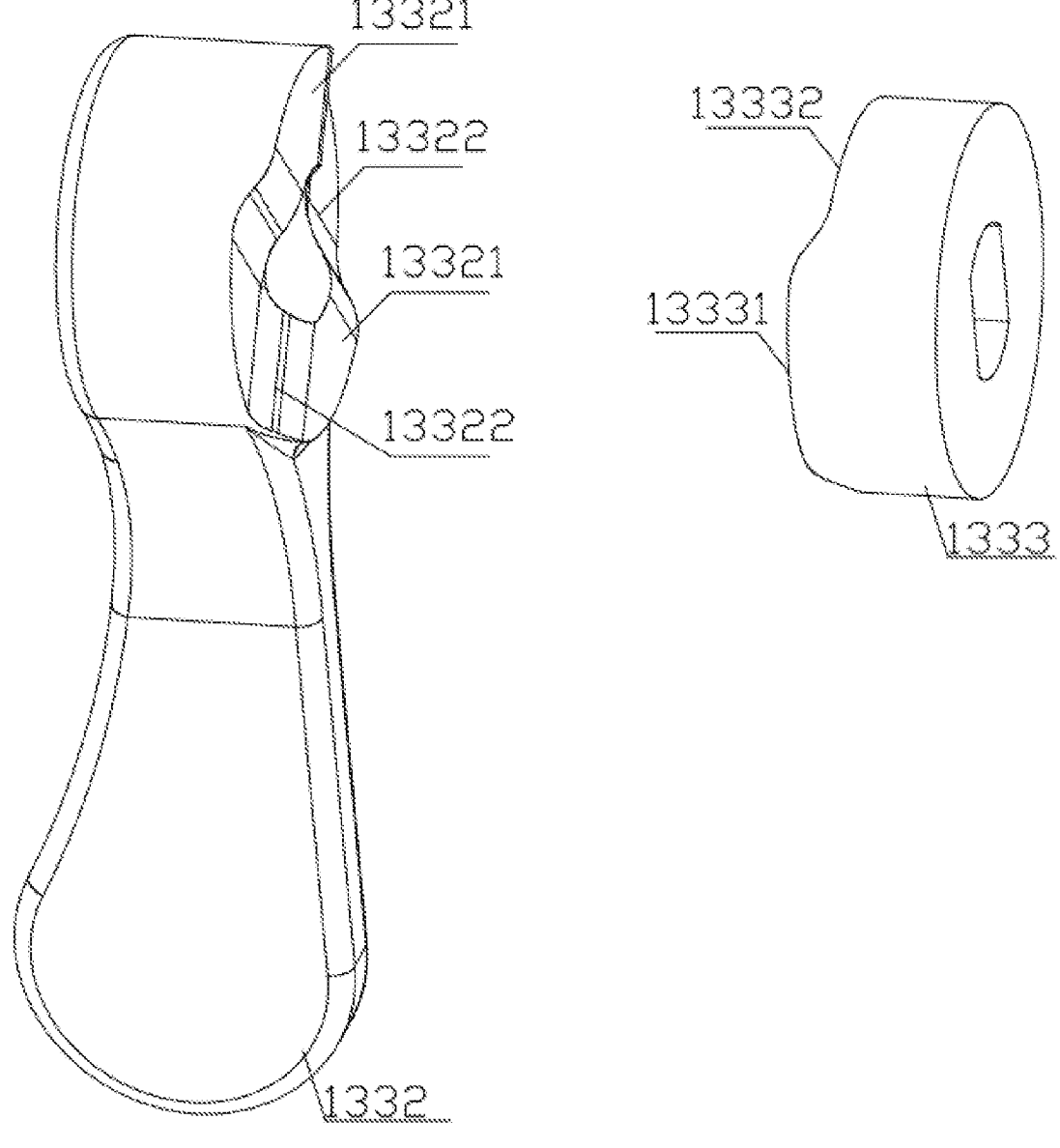
FIG. 5 illustrates a schematic view of a three-dimensional structure of a spanner and a fixed end from a first view.
Figure 6:
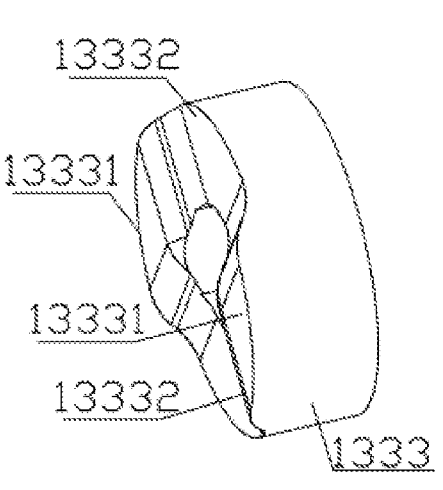
FIG. 6 illustrates a schematic view of a three-dimensional structure of a spanner and a fixed end from a second view.
Figure 6:
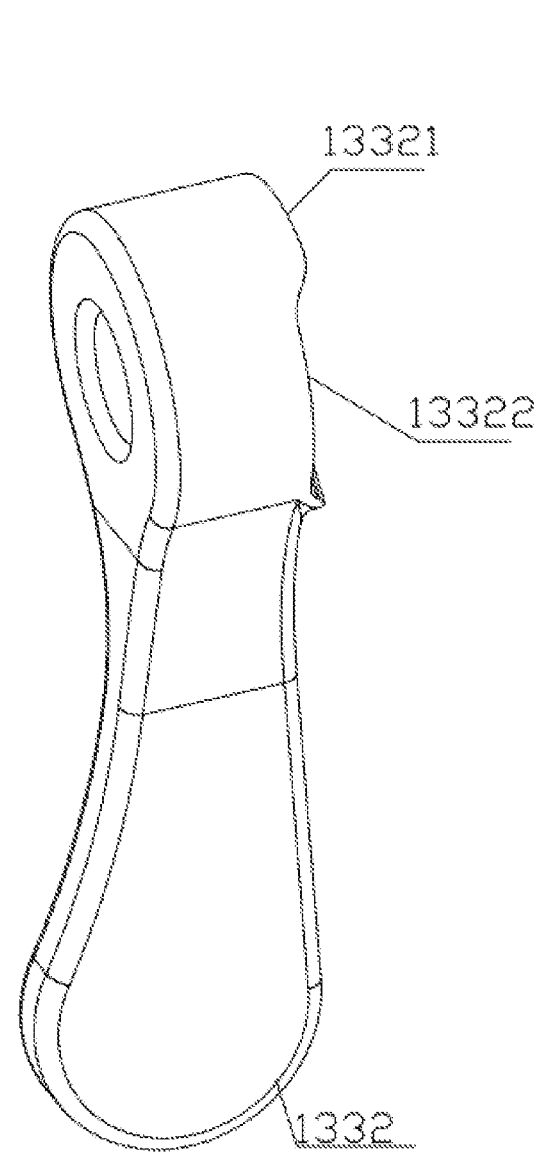

Referring to FIGS. 3 and 4, FIG. 4 illustrates a cross-sectional view of FIG. 2 at IV. The locking member 133 includes a threaded rod 1331, a spanner 1332, a fixed end 1333 and a nut 1334. One tail end of the threaded rod 1331 is threaded with the nut 1334. Between a head portion 13311 and a tail end of the threaded rod 1331, the threaded rod 1331 is sleeved with the spanner 1332, the fixed end 1333, the first mounting bracket 131 and the second mounting bracket 132, with a rotatable connection between the threaded rod 1331 and the spanner 1332, and an anti-rotation connection between the threaded rod 1331 and the fixed end 1333. Referring to FIGS. 5 and 6, a surface on a side of the spanner 1332 facing the fixed end 1333 includes a first convex surface 13321 and a first concave surface 13322, and a surface on a side of the fixed end 1333 facing the spanner 1332 includes a second convex surface 13331 and a second concave surface 13332. When the spanner 1332 is rotated relative to the threaded rod 1331 such that the first convex surface 13321 abuts against the second convex surface 13331, the first mounting bracket 131 and the second mounting bracket 132 are locked and cannot rotate relative to each other. When the spanner 1332 is rotated relative to the threaded rod 1331 such that the first convex surface 13321 abuts against the second concave surface 13332, and the second convex surface 13331 abuts against the first concave surface 13322, the first mounting bracket 131 and the second mounting bracket 132 are not locked, and can rotate relative to each other.

Since a distance between the head portion 13311 of the threaded rod 1331 and the nut 1334 is a constant value, when the first convex surface 13321 of the spanner 1332 abuts against the second convex surface 13331 of the fixed end 1333, the spanner 1332 and the fixed end 1333 occupied more space in a length direction of the threaded rod 1331, making the threaded rod 1331 in conjunction with the nut 1334 eliminate a movable gap between the first mounting bracket 131 and the second mounting bracket 132, the first mounting bracket 131 and the second mounting bracket 132 are locked and cannot rotate relative to each other. Conversely, when the spanner 1332 is rotated relative to the threaded rod 1331 such that the first convex surface 13321 of the spanner 1332 abuts against the second concave surface 13332 of the fixed end 1333, and the first concave surface 13322 of the spanner 1332 abuts against the second convex surface 13331 of the fixed end 1333, the spanner 1332 and the fixed end 1333 occupied less space in the length direction of the threaded rod 1331, making the first mounting bracket 131 and the second mounting bracket 132 have a movable gap between them and thus can move relative to each other.

In some embodiments, referring to FIGS. 5 and 6, the surface on the side of the spanner 1332 facing the fixed end 1333 includes two first convex surfaces 13321 and two first concave surfaces 13322, and the two first convex surfaces 13321 and the two first concave surface 13322 are set alternately; the surface on the side of the fixed end 1333 facing the spanner 1332 includes two second convex surfaces 13331 and two second concave surfaces 13332, and the two second convex surfaces 13331 and the two second concave surfaces 13332 are set alternately.

Therefore, the rotating angle of the locking member 133 for locking the first mounting bracket 131 to the second mounting bracket 132 is 90 degrees, achieving for quick locking.

It can be understood that, in other embodiments, the surface on the side of the spanner 1332 facing the fixed end 1333 includes one first convex surface 13321 and one first concave surface 13322. The surface on the side of the fixed end 1333 facing the spanner 1332 includes one second convex surface 13331 and one second concave surface 13332.

Therefore, the rotating angle of the locking member 133 for locking the first mounting bracket 131 to the second mounting bracket 132 is 180 degrees, also achieving for quick locking.

It can be understood that, in other embodiments, the surface on the side of the spanner 1332 facing the fixed end 1333 includes three first convex surfaces 13321 and three first concave surfaces 13322, and the three first convex surfaces 13321 and the three first concave surface 13322 are set alternately. The surface on the side of the fixed end 1333 facing the spanner 1332 includes three second convex surfaces 13331 and three second concave surfaces 13332, and the three second convex surfaces 13331 and the three second concave surfaces 13332 are set alternately.

Therefore, the rotating angle of the locking member 133 for locking the first mounting bracket 131 to the second mounting bracket 132 is 60 degrees, also achieving for quick locking.

It can be understood that, in other embodiments, the surface on the side of the spanner 1332 facing the fixed end 1333 includes four first convex surfaces 13321 and four first concave surfaces 13322, and the four first convex surfaces 13321 and the four first concave surface 13322 are set alternately. The surface on the side of the fixed end 1333 facing the spanner 1332 includes four second convex surfaces 13331 and four second concave surfaces 13332, and the four second convex surfaces 13331 and the four second concave surfaces 13332 are set alternately.

Therefore, the rotating angle of the locking member 133 for locking the first mounting bracket 131 to the second mounting bracket 132 is 45 degrees, also achieving for quick locking.

Accordingly, in the present disclosure, the rotation angle of the locking member 133 for locking the first mounting bracket 131 and the second mounting bracket 132 may be a variety of rotation angles, which may be set according to the actual needs, and will not be limited herein.

In some embodiments, referring to FIGS. 5 and 6, there is a smooth transition between the first convex surface 13321 and the first concave surface 13322, and there is also a smooth transition between the second convex surface 13331 and the second concave surface 13332.

Therefore, a process of operating the spanner 1332 for locking or releasing can be smoother and more maneuverable.

In some embodiments, referring to FIGS. 3 and 4, the threaded rod 1331 includes the head portion 13311, a cylindrical portion 13312, a flattened portion 13313 and a screwed portion 13314 sequentially connected. The spanner 1332 sleeves onto the cylindrical portion 13312. The fixed end 1333, the first mounting bracket 131 and the second mounting bracket 132 sleeves onto the flattened portion 13313. The nut 1334 is sleeved to the screwed portion 13314. The screwed portion 13314 is the tail end of the threaded rod 1331.

Therefore, the threaded rod 1331 is adaptively designed based on the shape of the holes in the spanner 1332, the fixed end 1333, the first mounting bracket 131, the second mounting bracket 132 and the nut 1334 to better meet the requirements for quick locking.

In some embodiments, referring to FIG. 3, the first mounting bracket 131 includes two first sidewalls 1311 opposite to each other and a connecting tube 1312 connected between the two first sidewalls 1311. Two opposite openings of the connecting tube 1312 both have flat shapes. The first sidewall 1311 defines a first connecting hole 1313. The first connecting hole 1313 and the opening of the connecting tube 1312 are spaced apart in a height direction of the display mounting support 1.

In some embodiments, referring again to FIG. 3, the second mounting bracket 132 includes a second bracket body 1321 and a second sidewall 1322; the second sidewall 1322 is connected to the second bracket body 1321. The second sidewall 1322 defines an arcuate hole 1323 and a second connecting hole 1324 spaced apart in the height direction. A center of the arcuate hole 1323 is located on a center of the second connecting hole 1324.

In some embodiments, the arcuate hole 1323 corresponds to the opening of the connecting tube 1312, and the first connecting hole 1313 corresponds to the second connecting hole 1324, and the flattened portion 13313 passes through the arcuate hole 1323 and the connecting tube 1312, the flattened portion 13313 is shaped to cooperate with the flattened opening of the connecting tube 1312 to achieve the anti-rotation connection.

Figure 7:
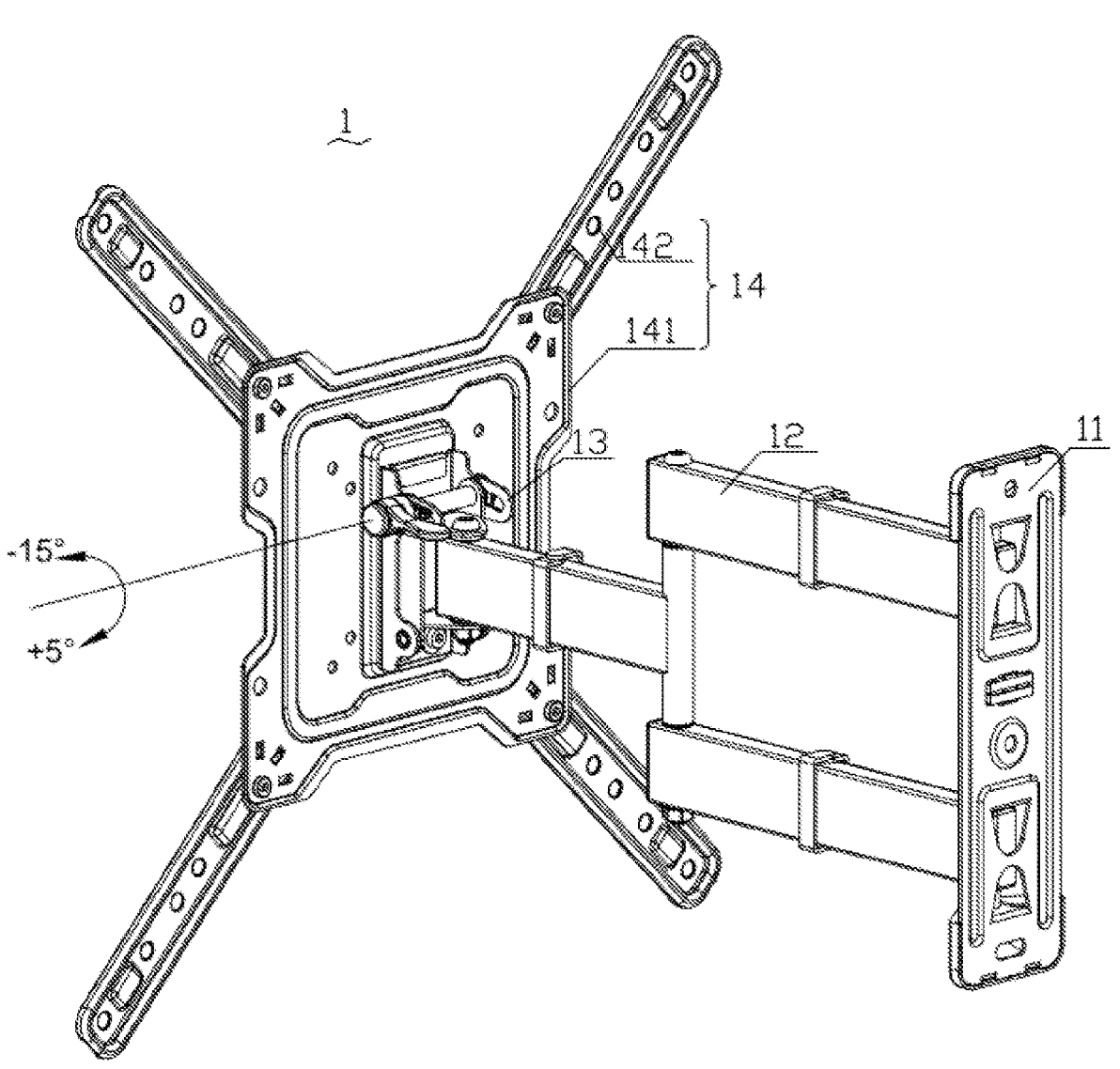
FIG. 7 illustrates a schematic view of the display mounting support for adjusting a pitch tilt angle in according with one embodiment of the present disclosure.
Figure 8:
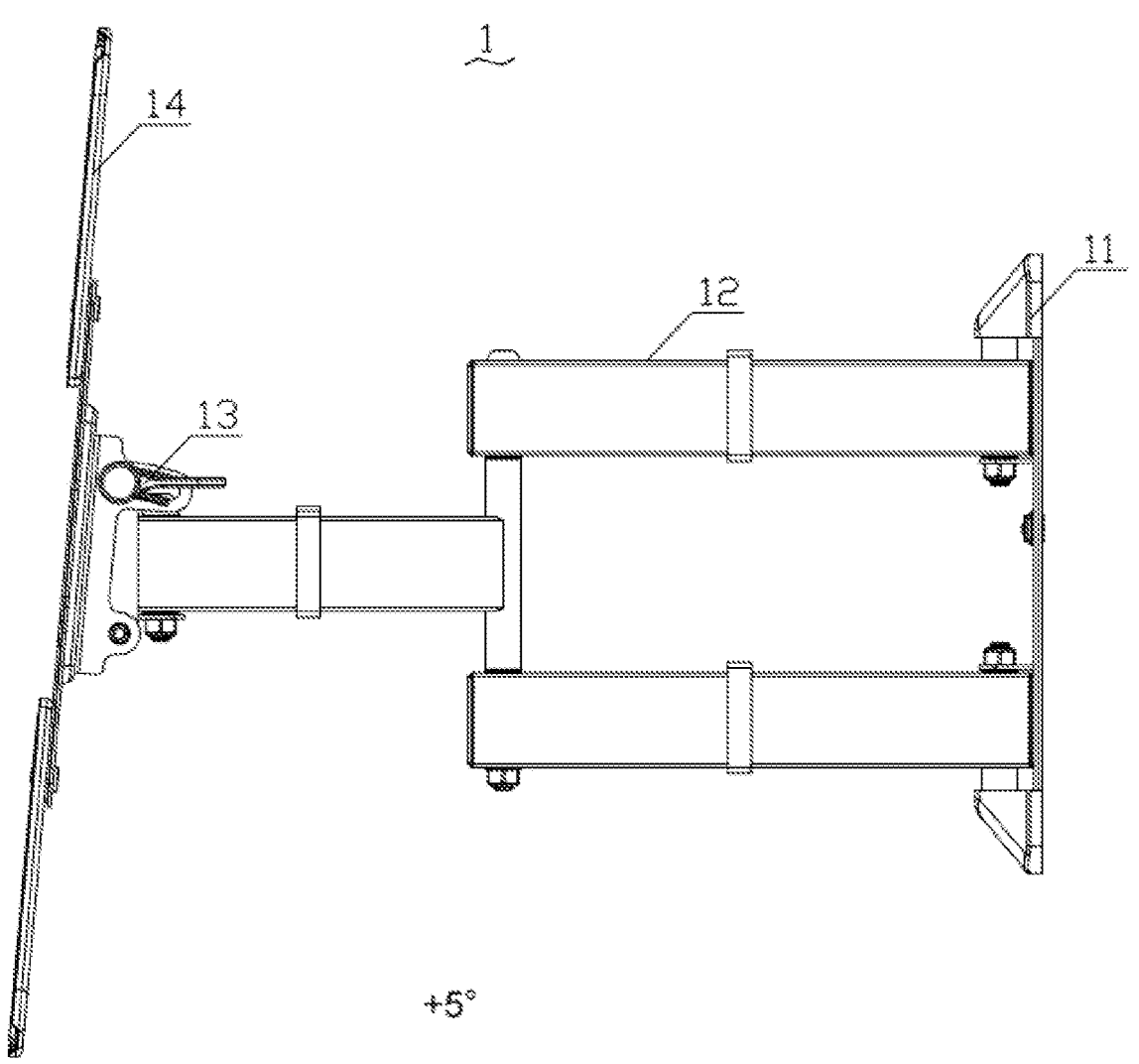
FIG. 8 illustrates a schematic view of the display mounting support for adjusting an upward tilt angle in according with one embodiment of the present disclosure.
Figure 9:
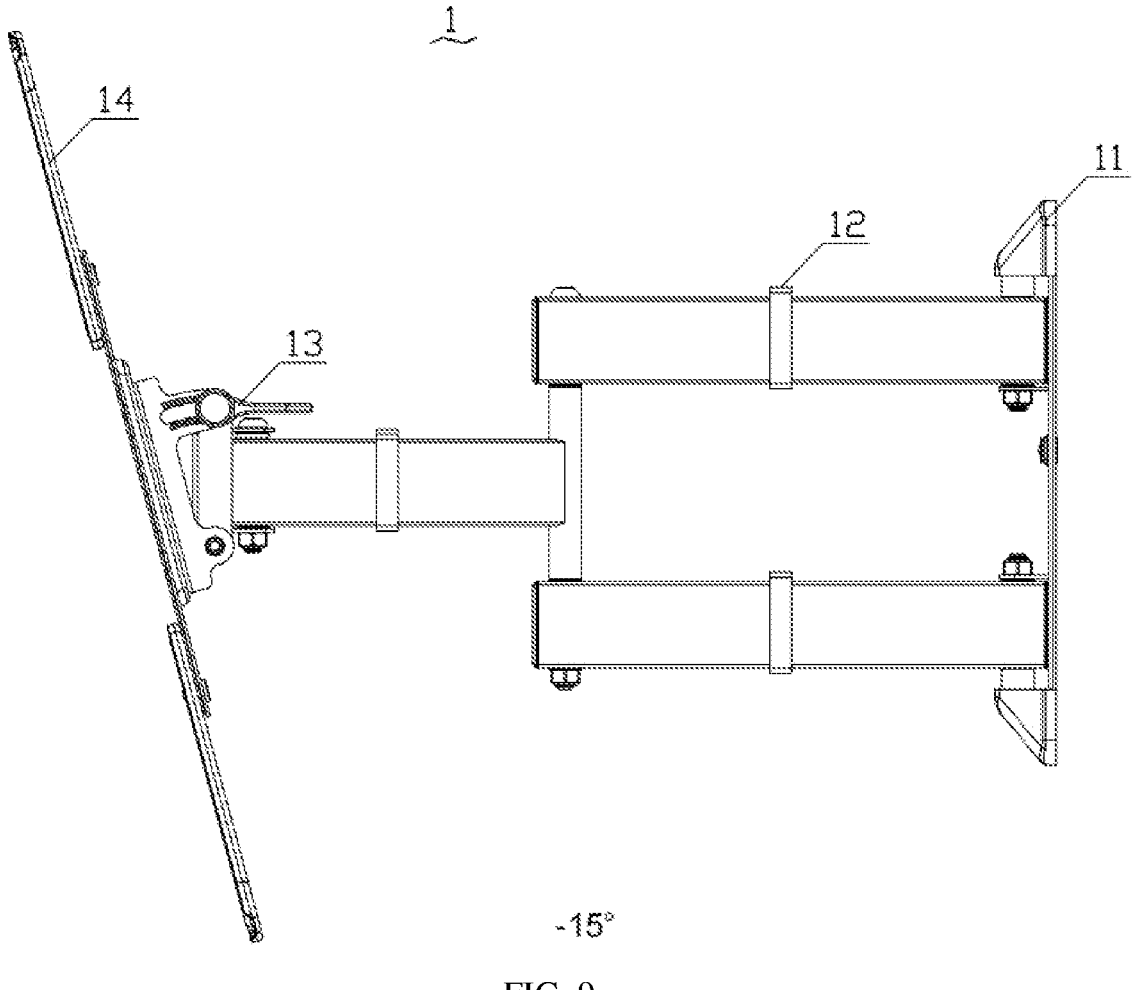
FIG. 9 illustrates a schematic view of the display mounting support for adjusting a downward tilt angle in according with one embodiment of the present disclosure.

Therefore, referring to FIG. 7, the second mounting bracket 132 can be tilted forward or backward relative to the first mounting bracket 131, and thus, by fixing the threaded rod 1331 to a different position of the arcuate hole 1323, the pitch tilt angle of the mounting frame 14 relative to the wall plate 11 can be adjusted. In some embodiments, referring to FIG. 8, a maximum value of an upward tilt angle of the second mounting bracket 132 relative to the first mounting bracket 131 is 5 degrees; referring to FIG. 9, a maximum value of a downward tilt angle of the second mounting bracket 132 relative to the first mounting bracket 131 is 15 degrees. Also, the connecting tube 1312 is connected between the two first sidewalls 1311 set opposite to each other, which can increase a connection strength between the two first sidewalls 1311, increasing the support of the two first sidewalls 1311 to the second sidewall 1322, avoiding a movable gap between the first sidewall 1311 and the second sidewall 1322 from appearing due to the first sidewall 1311 is pulled and deformed by the threaded rod 1331 during a process of the spanner 1332 locking the first rotating bracket 131 and the second rotating bracket 132, being able to increase the structural strength and reliability between the first mounting bracket 131 and the second mounting bracket 132.

It can be understood that in some other embodiments, the connecting tube 1312 may be omitted when there is sufficient compressive strength between two the second sidewalls 1322.

In some embodiments, referring again to FIG. 3, the first mounting bracket 131 further includes at least one mounting arm 1314. The at least one mounting arm 1314 is arranged at intervals in the height direction. An end of the at least one connecting arm 12 is connected to the mounting arm 1314.

In this embodiment, the at least one mounting arm 1314 includes two mounting arms 1314. The two mounting arm 1314 are arranged at intervals in the height direction. The two mounting arms 1314 cooperatively form a mounting space. The connecting arm 12 is inserted into the mounting space. The display mounting support 1 further includes a bolt 125. The bolt 125 connects the two mounting arms 1314 and the end of the connecting arm 12 along the height direction Z.

It can be understood that in other embodiments, the at least one mounting arm 1314 may include a single mounting arm 1314 or a plurality of mounting arms 1314, without limitation herein.

In some embodiments, the first mounting bracket 131 further includes a first bracket body 1315. The first bracket body 1315 is connected between the two first sidewalls 1311; at least one of the mounting arms 1314 is connected between the first bracket body 1315 and/or the at least one first sidewall 1311.

In this embodiment, the two mounting arms 1314 are connected to the first bracket body 1315. It can be understood that in other embodiments, the two mounting arms 1314 may be connected to the first sidewall 1311 or partially connected to the first sidewall 1311 and partially connected to the first bracket body 1315, without limitation herein.

Therefore, the at least one mounting arm 1314 has diverse setting ways.

In some embodiments, the two mounting arms 1314 are located below the connecting tube 1312, and the two mounting arms 1314 are formed by folding over from two opposite ends of the first bracket body 1315.

In some embodiments, the height of the first sidewall 1311 is greater than the height of the first bracket body 1315, so that the first sidewall 1311 extends out from a top end of the first bracket body 1316, and the two mounting arms 1314 are connected to the top and bottom ends of the first bracket body 1315, and the connecting tube 1312 is connected to the portions of the two first sidewalls 1311 extending out from the first bracket body 1315.

Thereby, the first mounting bracket 131 not only realizes a connection between the connecting arm 12 and the second mounting bracket 132, but also has a compact structure as well as sufficient structural strength to save costs.

In some embodiments, referring again to FIG. 2, the display mounting support 1 further includes a hook 15 and a connecting member 16 both located on a side of the mounting frame 14 facing the connecting arm 12. The hook 15 is suspended on a top end of the second bracket body 1321. The connecting member 16 is connected to a bottom end of the second bracket body 1321.

Therefore, the second mounting bracket 132 realizes a connection with the mounting frame 14, and a preliminary connection between the mounting frame 14 and the second mounting bracket 132 is realized by the hook 15 hanging on the top end of the second bracket body 1321, and then locking connection between the mounting frame 14 and the second mounting bracket 132 is realized by the connecting member 16 connected to the bottom end of the second bracket body 1321, which can reduce the time duration for staff to lift the display screen and reduce mounting difficulty.

In some embodiments, the top end of the second bracket body 1321 includes a hanging portion 1325; a bottom end of the second bracket body 1321 defines a connecting groove 1326. The hook 15 cooperates with the hanging portion 1325. The connecting member 16 passes through the connecting groove 1326 to securely connect the second bracket body 1321 to the mounting frame 14.

Therefore, the mounting frame 14 is initially hung on the hanging portion 1325 by means of the hook 15, and the connecting member 16 is inserted into the connecting groove 1326, thus the mounting frame 14 can be mounted on the second mounting bracket 132.

In some embodiments, the hanging portion 1325 is an arc curved downwardly at two ends and the connecting groove 1326 is an arc curved upwardly at two ends. In preferred embodiments, a radius of the arc of the hanging portion 1325 and a radius of the arc of the connecting groove 1326 are the same.

Therefore, by the hook 15 hanging on different positions of the hanging portion 1325 and the connecting member 16 locking into different positions of the connecting groove 1326, the mounting frame 14 can be mounted to the wall plate 11 with different left-right tilt angles, so as to adjust the left-right tilt angle of the mounting frame 14 relative to the wall plate 11. Therefore, in the event that the wall plate 11 is not sufficiently level for mounting relative to a wall, the level of the mounting frame 14 can be adjusted by the hook 15 being pressed against the hanging portion 1325 at different positions, and the connecting member 16 locking the mounting frame 14 at different positions of the connecting groove 1326, such that the display screen can be mounted on mounting frame 14 with sufficient level, without need to re-punch holes to install the wall plate 11, simplifying installation for staff.

In some embodiments, the hook 15 is also an arc curved upwardly at two ends, and the arc of the connecting groove 1326 is co-centered with the arc of the hook 15.

Therefore, the hook 15 is an arc curved upwardly at two ends, and the hanging portion 1325 is an arc curved downwardly at two ends; when the mounting frame 14 is tilted to the left, the hook 15 is tilted to the left, the left side portion of the hook 15 abuts against the left side portion of the hanging portion 1325; when the mounting frame 14 is tilted to the right, the hook 15 is tilted to the right, the right side portion of the hook 15 abuts against the right side portion of the hanging portion 1325, similar to the principle of rotational meshing of two cylindrical gears, making the hook 15 engage with the hanging portion 1325 more stable, and having a larger rotating angle.

In some embodiments, referring again to FIG. 2, the connecting arm 12 includes a first connecting arm 121 and a second connecting arm 122. The first connecting arm 121 is connected to the wall plate 11. The second connecting arm 122 is connected to one end of the first connecting arm 121 away from the wall plate 11. The end of the second connecting arm 122 away from the wall plate 11 is a terminal end of the connecting arm 12, for connecting to the first mounting bracket 131.

Therefore, the first connecting arm 121 can rotate about a vertical axis relative to the wall plate 11, the second connecting arm 122 can rotate about a vertical axis relative to the first connecting arm 121, and the first mounting bracket 131 can rotate about a vertical axis relative to the second connecting arm 122, so that the first connecting arm 121 can be rotated to a position substantially abutting against the wall plate 11, and the second connecting arm 122 can be rotated relative to the first connecting arm 121 to a position substantially abutting against the first connecting arm 121. The vertical axes are parallel to the Z-axis direction. Therefore, the connecting arm 12 as a whole has a function of contracting and expanding in a front-to-back direction and can be rotated as a whole towards the left and right side.

Therefore, the connecting arm 12 can realize a function of expanding and contracting in the front-back direction and rotating in the left-right direction.

In summary, the display mounting support 1 has four adjustable dimensions of front-to-back expansion and contraction, left-to-right rotation, up-to-down tilting, and left-to-right tilting, and thus it can be adapted to the fine adjustment in most working scenes to meet the adjustment demand.

In some embodiments, referring to FIG. 2, the mounting frame 14 includes a frame portion 141 and four extension strips 142. The four extension strips 142 are connected to the four corners of the frame portion 141 respectively.

Therefore, a smaller display screen can be mounted by using the frame portion 141 alone, and a larger display screen can be mounted when the frame portion 141 is coupled with the extension bars 142, increasing the malleability of the mounting frame 14.

In some embodiments, the wall plate 11 is mounted with a spirit level, which can be used by the user to observe its mounting level during mounting for the convenience of the staff.

Figure 10:
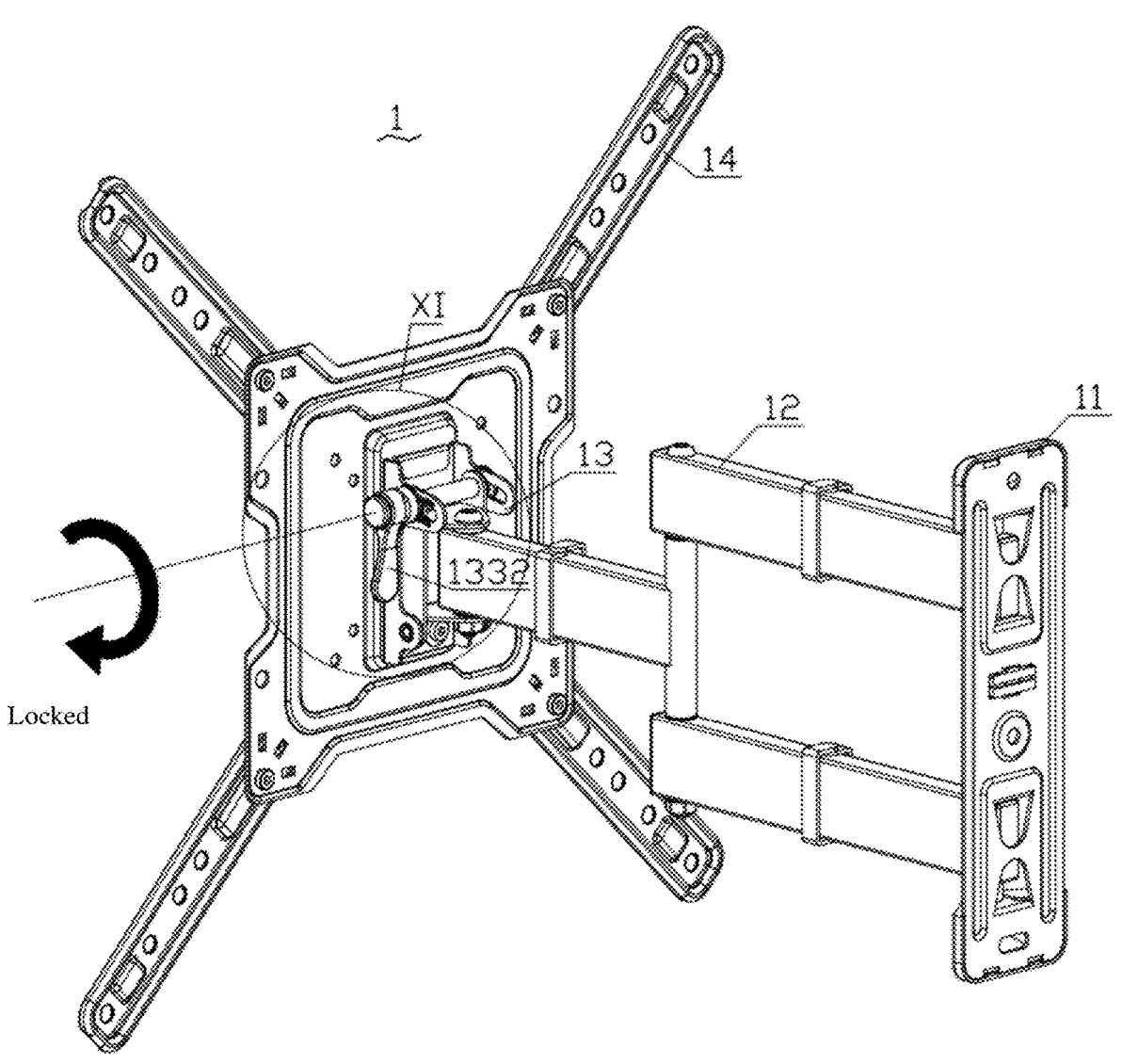
FIG. 10 illustrates a schematic view of a locking process of the display mounting support in according with one embodiment of the present disclosure.
Figure 11:
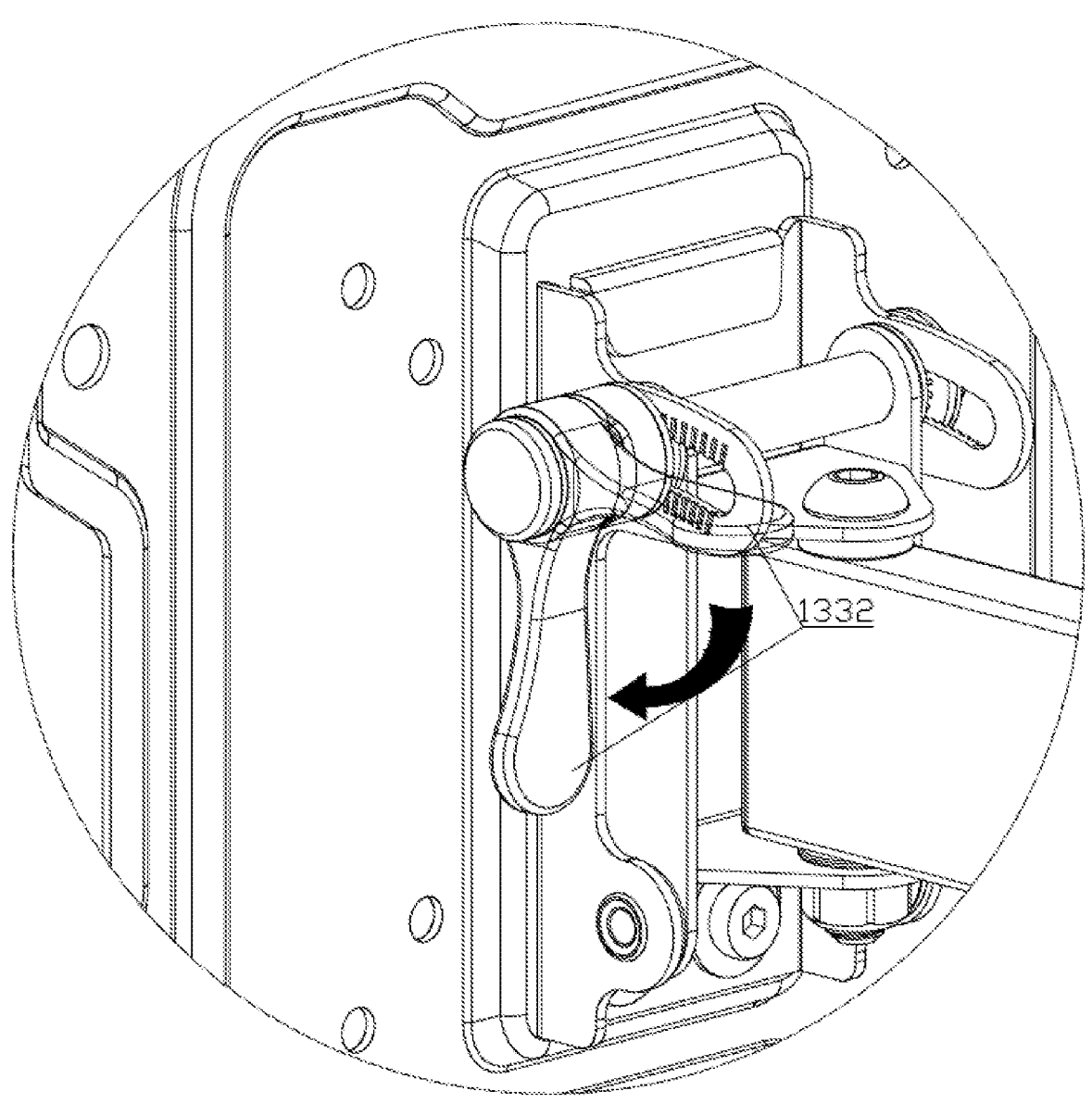
FIG. 11 illustrates an enlarged view of the locking process of FIG. 10 at XI.

Referring to FIGS. 10 and 11, the spanner 1332 as shown in FIG. 10 is set vertically with the display mounting support 1 in a locked state, the spanner 1332 as shown in FIG. 11 with a dashed line is set horizontally with the display mounting support 1 in an adjusting state, and the spanner 1332 as shown in FIG. 11 with a solid line is set vertically with the display mounting support 1 in the locked state, i.e., a clockwise rotation of 90 degrees can switch from the adjusting state to the locked state, which can realize fast locking.

Figure 12:
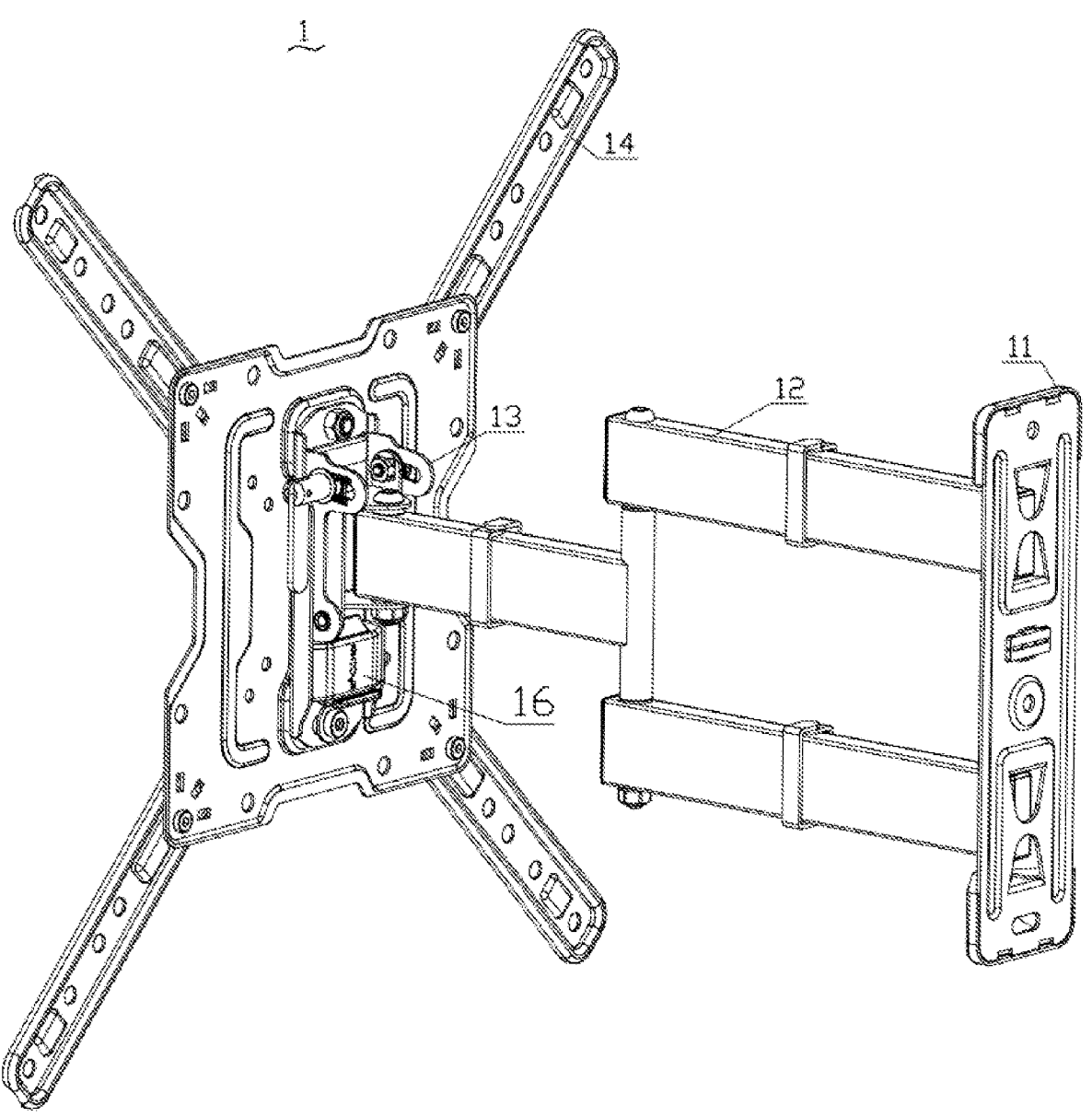
FIG. 12 illustrates a schematic view of a three-dimensional structure of the display mounting support in according with another embodiment of the present disclosure.
Figure 13:
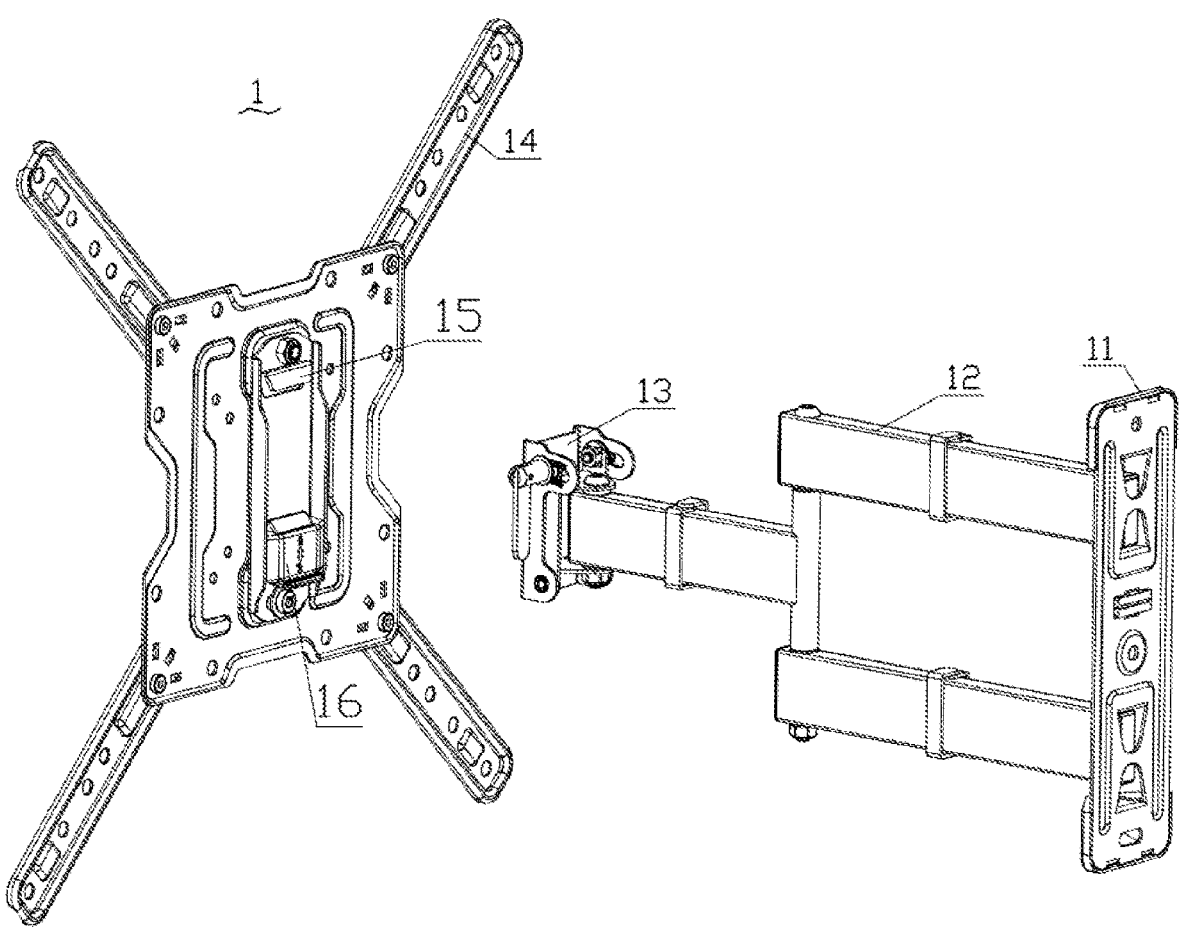
FIG. 13 illustrates a partial exploded view of FIG. 12.
Figure 14:
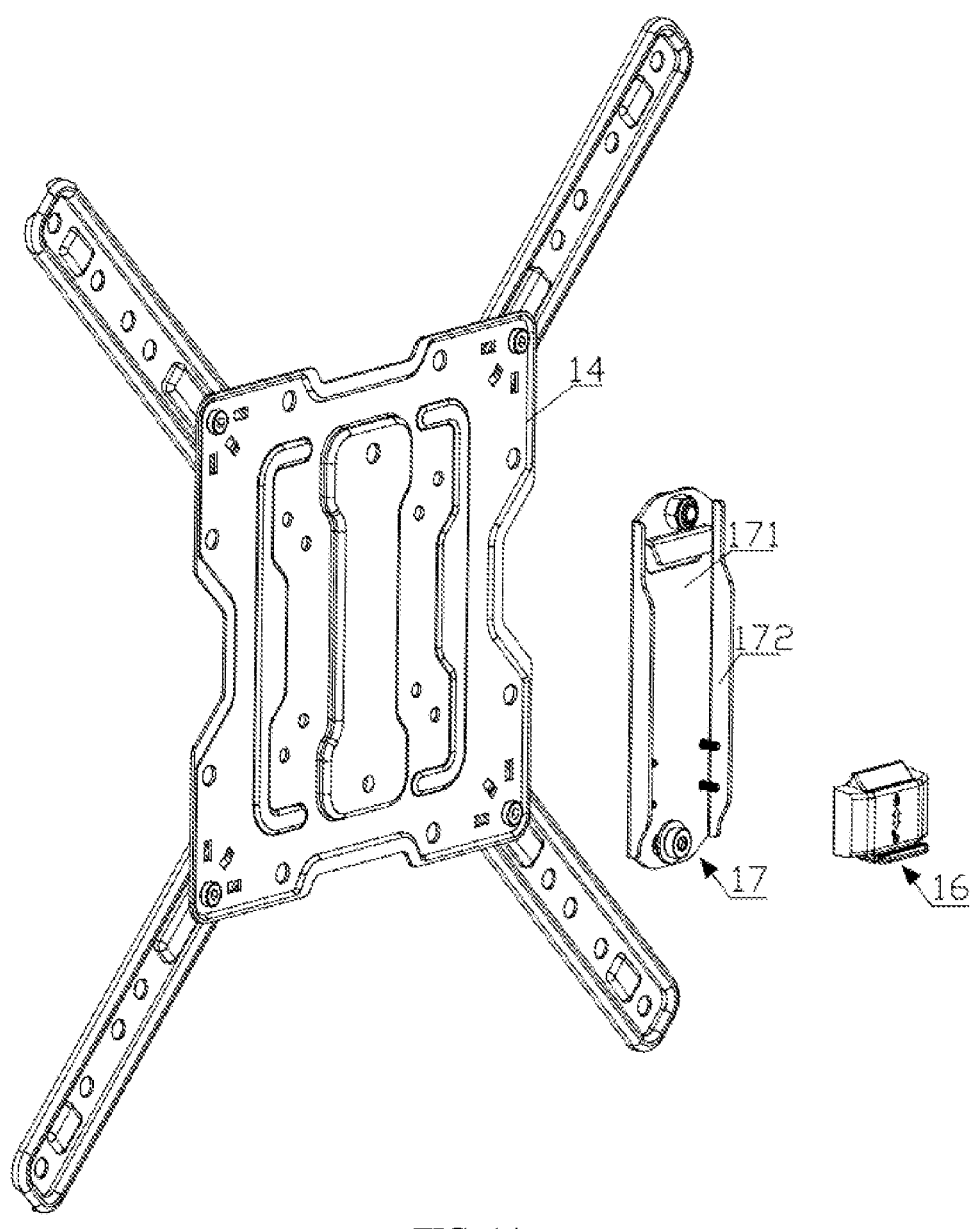
FIG. 14 illustrates an exploded view of a mounting frame, a connecting disc and a connecting member in FIG. 13.

Referring to FIGS. 12, 13 and 14, in other embodiments, the display mounting support 1 further includes a connecting bracket 17. The connecting bracket 17 is connected to a surface of the mounting frame 14 on the side facing the wall plate 11. The hook 15 and the connecting member 16 are connected to the connecting bracket 17.

Therefore, the structural strength of the mounting frame 14 can be further increased by the connecting bracket 17, and, the installation convenience can be further increased.

In some embodiments, the connecting bracket 17 includes a bracket body 171 and two sidewalls 172 connected to opposite sides of the bracket body 171. The hook 15 and the connecting member 16 are connected to the bracket body 171.

Therefore, the overall structural strength of the connecting bracket 17 can be increased at least by the sidewall 172.

It can be understood that in other embodiments, the connecting bracket 17 may be omitted.

Figure 15:
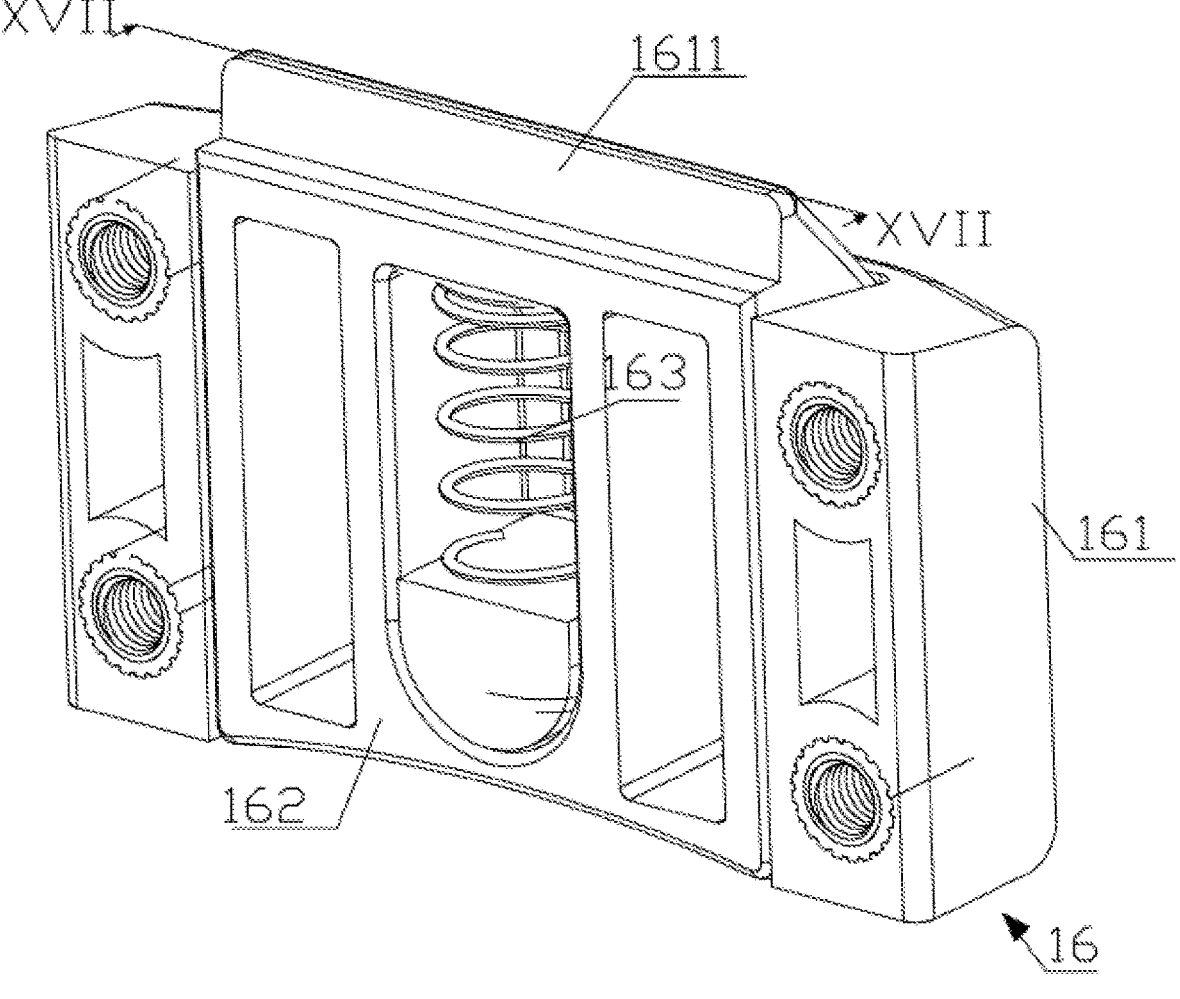
FIG. 15 illustrates a schematic view of a three-dimensional structure of the connecting member of FIG. 14 from another view.
Figure 16:
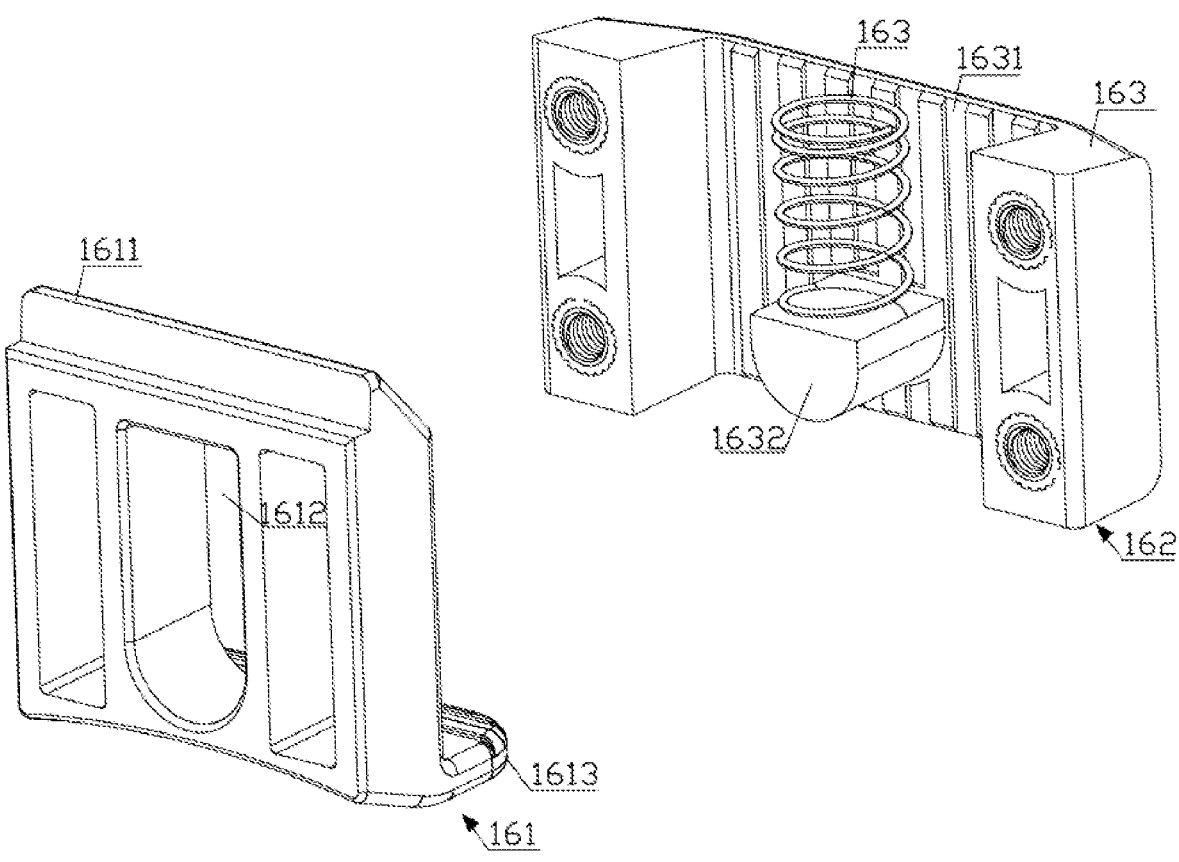
FIG. 16 illustrates an exploded view of FIG. 15.

Referring to FIGS. 14, 15 and 16 together, the connecting member 16 is an elastic snap member. The connecting member 16 includes an elastic snap hook 1611. The elastic snap hook 1611 can be retracted and resiliently reset. The elastic snap hook 1611 is snapped to the bottom end of the second bracket body 1321 of the second mounting bracket 132, so as to realize quick installation between the connecting member 16 and the second mounting bracket 132, and to simplify the mounting process of the display mounting support 1.

Referring to FIGS. 15 and 16, the connecting member 16 includes a safety member 161, an elastic member 163 and a sliding seat 162. The sliding seat 162 is connected to the mounting frame 14. In this embodiment, the sliding seat 162 is connected to the bracket body 171 of the connecting bracket 17. One side of the sliding seat 162 facing the mounting frame 14 is recessed to form an upper and lower sliding space 1631. The safety member 161 is inserted into the sliding space 1631. One end of the elastic member 162 is connected to the sliding seat 162 and the other end of the elastic member 162 is connected to the safety member 161. A top end of the safety member 161 forms the elastic snap hook 1611.

Therefore, a reliable and stable elastic telescopic connection between the safety member 161 and the sliding seat 163 is achieved.

Figure 17:
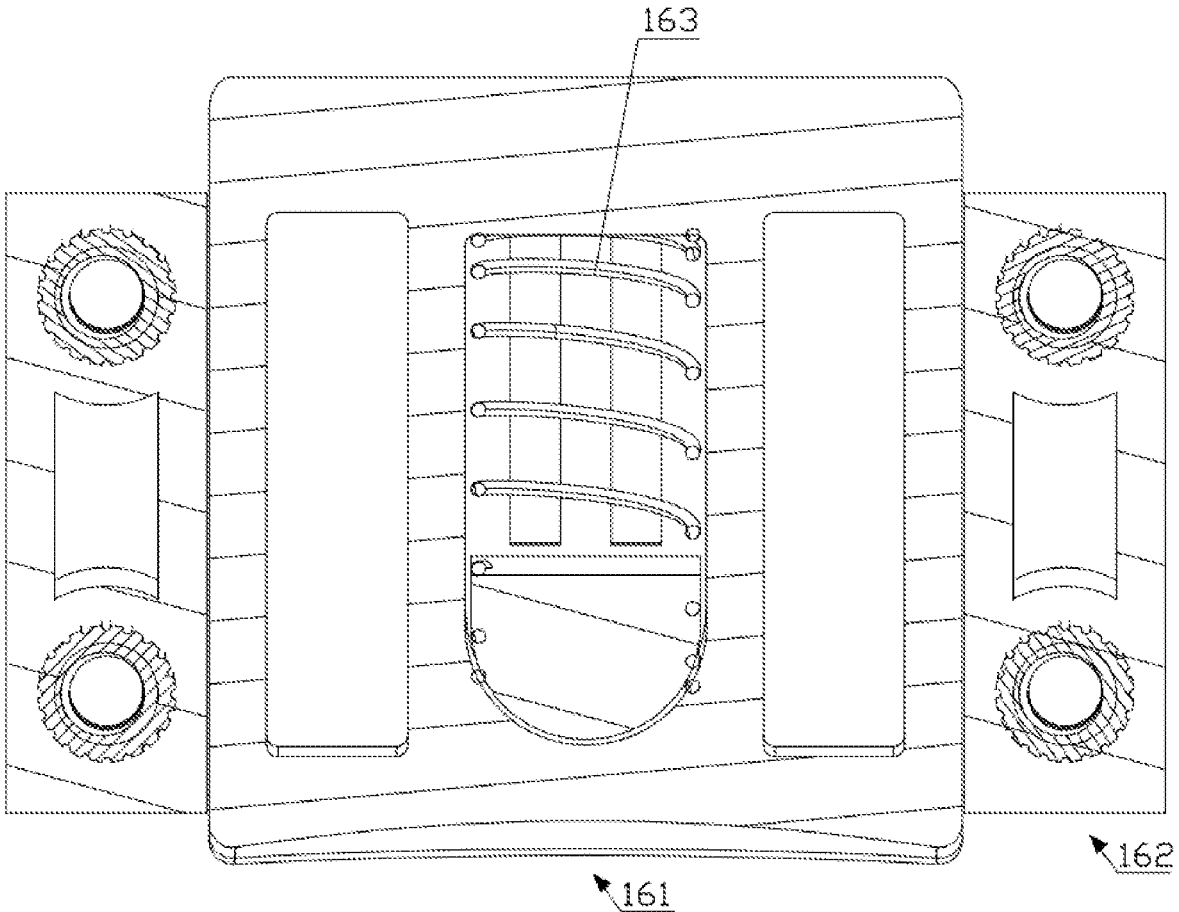
FIG. 17 illustrates a cross-sectional view of FIG. 15 at XVII-XVII.

In some embodiments, referring together to FIG. 17, an inner wall of the sliding seat 162 is protruded with a resisting post 1632; the safety member 161 defines a receiving groove 1612. The resisting post 1632 is inserted into the receiving groove 1612. One end of the elastic member 163 is abutted against or connected to a top wall of the receiving groove 1612, and the other end of the elastic member 163 is abutted against or connected to the resisting post 1632.

Therefore, the elastic member 163 can be stably and reliably connected between the top wall of the receiving groove 1612 and the resisting post 1632.

In some embodiments, the bottom wall of the resisting post 1632 is a curved wall, the bottom wall of the receiving groove 1612 is also a curved wall, and the bottom wall of the resisting post 1632 abuts against the bottom wall of the receiving groove 1612.

Therefore, the bottom wall of the resisting post 1632 is in face-to-face contact with the bottom wall of the receiving groove 1612, and the fit between them is more stable.

In some embodiments, the top wall of the resisting post 1632 is a planar wall and the top wall of the receiving groove 1612 is correspondingly a planar wall.

Therefore, the top wall of the resisting post 1632 and the top wall of the receiving groove 1612 are both planar, facilitating installation of the elastic member 163.

In some embodiments, the bottom end of the safety member 161 is L-shaped to form an operating end 1613.

Therefore, the operating end 1613 is L-shaped, which can increase the convenience of operation.

Figure 18:
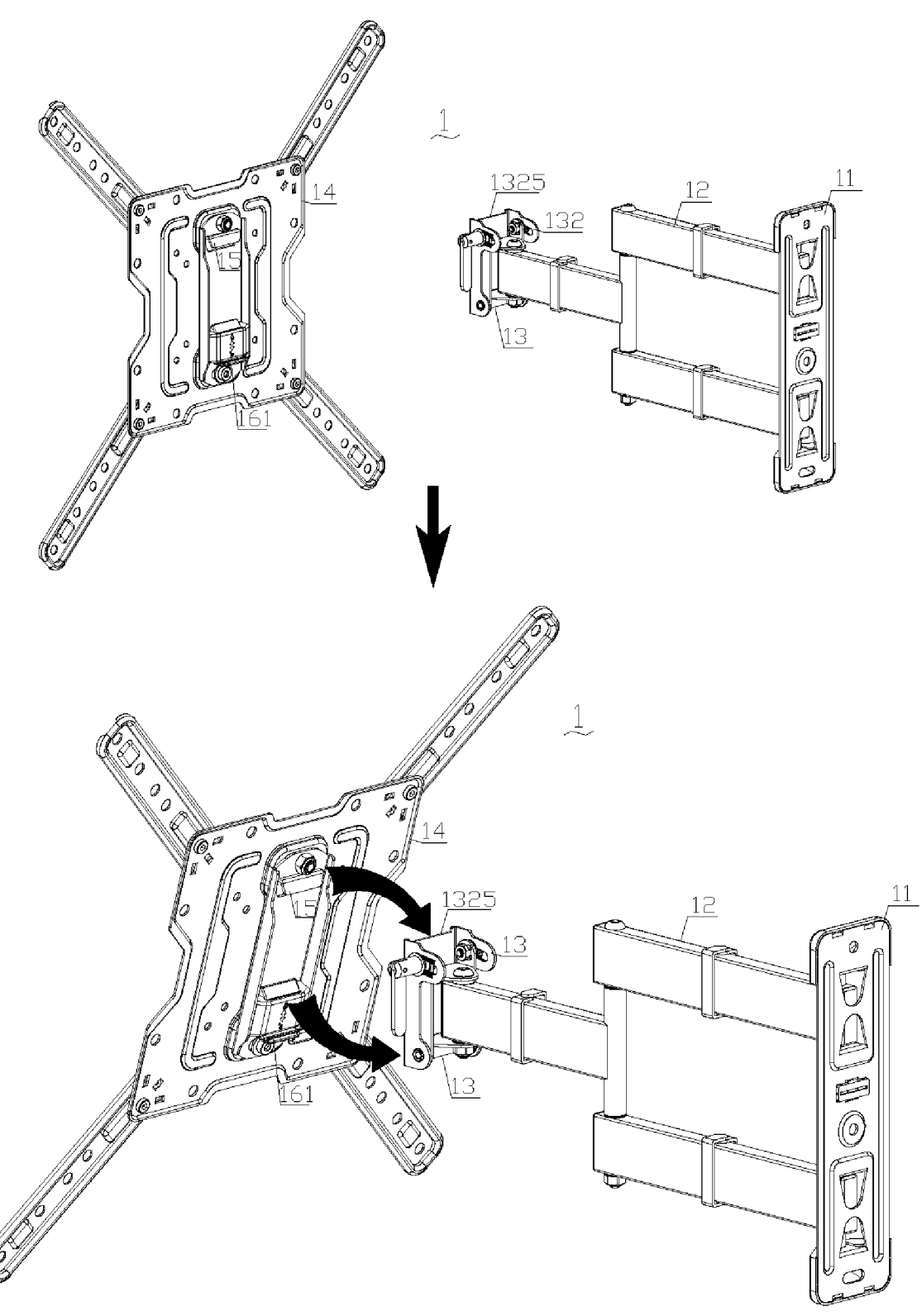
FIG. 18 illustrates a schematic view of a mounting process of the display mounting support in according with another embodiment of the present disclosure.

Referring to FIG. 18 together, when mounting the mounting frame 14 to the tilt adjustment assembly 13, the hook 15 is first hung to the hanging portion 1325 of the second mounting bracket 132 of the tilt adjustment assembly 1313 to realize preliminary mounting, and then, the safety member 161 is pulled down so that the elastic snap hook 1611 of the safety member 161 is located below the bottom end of the second mounting bracket 132, and then the safety member 161 is released, the elastic restoring force of the elastic member 163 drives the elastic snap hook 1611 of the safety member 161 to move upwardly and snap against the bottom end of the second mounting bracket 132.

Figure 19:
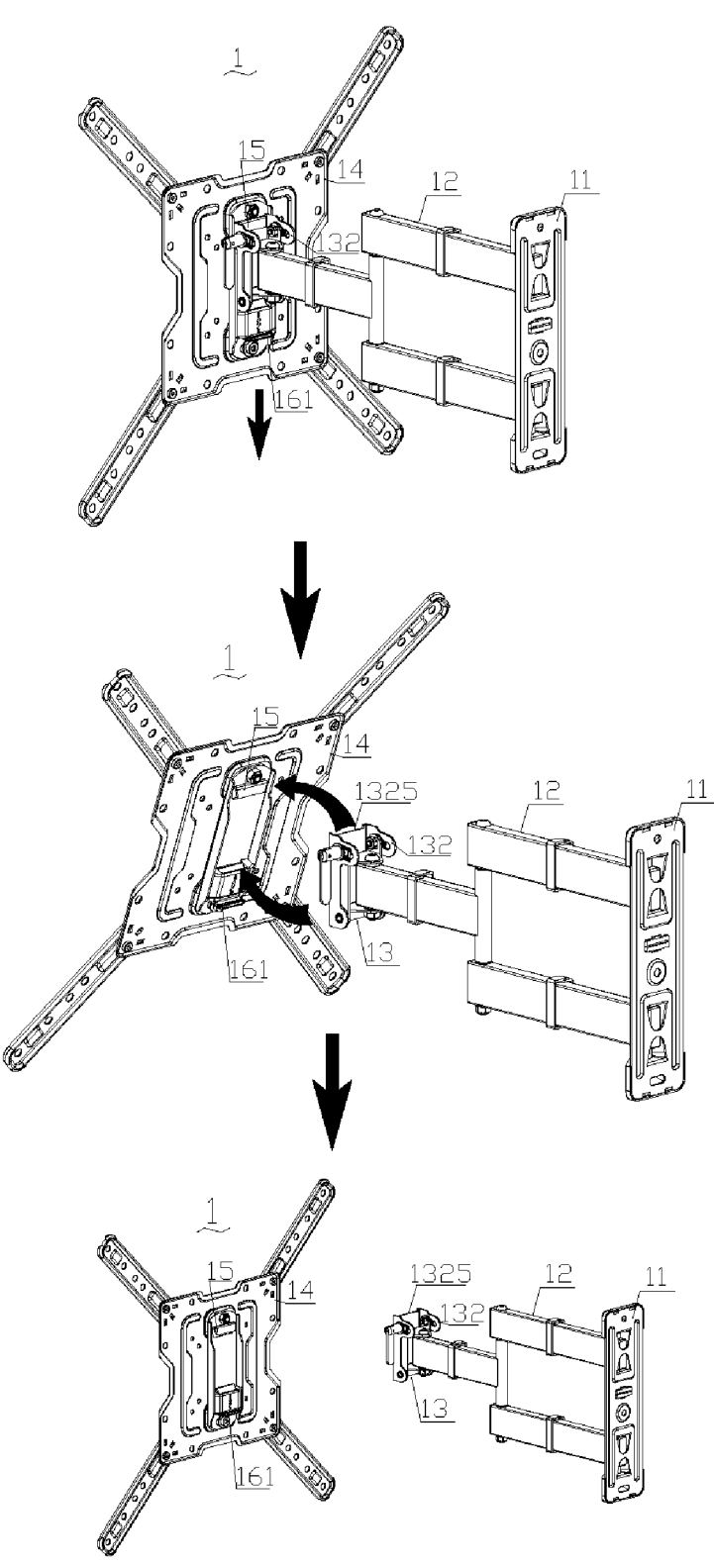
FIG. 19 illustrates a schematic view of a removal process of the display mounting support in according with another embodiment of the present disclosure.

Referring to FIG. 19, when removing the mounting frame 14 from the tilt adjustment assembly 13, the safety member 161 is pulled down so that the elastic snap hook 1611 of the safety member 161 is located below the bottom end of the second mounting bracket 132, the safety member 161 is disengaged from the bottom end of second mounting bracket 132, at which point the mounting frame 14 can be removed from the second mounting bracket 132.

It can be understood that in other embodiments, the locking member 133 may also be replaced with an ordinary locking member, without limitation herein.

It can be understood that in other embodiments, the connecting member 16 may also be a threaded connecting member such as a screw or a bolt.

It can be understood that in other embodiments, the display mounting support 1 may include not only the locking member 133 capable of realizing fast locking, but also the connecting member 16 having the elastic snap hook 1611 capable of realizing fast mounting, and thus, both fast locking and fast mounting may be realized.

The above description of the technical solution of the subject matter of the present disclosure as well as the corresponding details are described above, and it can be understood that the above description is only at least one embodiment of the technical solution of the subject matter of the present disclosure, and some of the details can also be omitted in its specific implementation.

In addition, in at least one embodiment of the above present disclosure, there are multiple embodiments of the combination of implementation possibilities, various combination programs are limited to space will not be listed. The technical personnel in the field can freely combine the implementation of the above embodiments according to the needs of the specific implementation, in order to obtain a better application experience.

In summary, it can be understood that the present disclosure has the above mentioned excellent characteristics, so that it can be used to enhance the effectiveness of the previous technology has not been practical, and become a very practical value of the product.

The above is only a better example of the present disclosure, and is not intended to limit the present disclosure. Any modification, equivalent substitution or improvement made within the ideas and principles of the present disclosure shall be included in the scope of protection of the present disclosure.

What is claimed is:

1. A display mounting support, wherein the display mounting support comprises a wall plate, a connecting arm, a tilt adjustment assembly, and a mounting frame; the connecting arm is connected between the wall plate and one side of the tilt adjustment assembly, and the other side of the tilt adjustment assembly is connected to the mounting frame; one side of the mounting frame away from the tilt adjustment assembly is configured for mounting a display screen; the tilt adjustment assembly comprises a first mounting bracket, a second mounting bracket and a locking member; the first mounting bracket is rotatably connected to the connecting arm; the second mounting bracket is connected to the mounting frame; the locking member is connected between the first mounting bracket and the second mounting bracket; rotating the second mounting bracket relative to the first mounting bracket is capable of adjusting a pitch tilt angle of the second mounting bracket relative to the first mounting bracket; rotating the locking member is capable of locking the first mounting bracket to the second mounting bracket, and a rotating angle of the locking member for locking the first mounting bracket to the second mounting bracket is less than or equal to 180 degrees;

wherein the locking member comprises a threaded rod, a spanner, a fixed end and a nut; the threaded rod is threaded with the nut; between a head portion of the threaded rod and the nut, the threaded rod is sleeved with the spanner, the fixed end, the first mounting bracket and the second mounting bracket; the threaded rod is rotatably connected with the spanner; the threaded rod and the fixed end are anti-rotation connected; a surface on a side of the spanner facing the fixed end comprises a first convex surface and a first concave surface, and a surface on a side of the fixed end facing the spanner comprises a second convex surface and a second concave surface; when the spanner is rotated relative to the threaded rod such that the first convex surface abuts against the second convex surface, the first mounting bracket and the second mounting bracket are locked and cannot rotate relative to each other; and when the spanner is rotated relative to the threaded rod such that the first convex surface abuts against the second concave surface, and the second convex surface abuts against the first concave surface, the first mounting bracket and the second mounting bracket are not locked, and can rotate relative to each other.

2. The display mounting support according to claim 1, wherein the rotating angle of the locking member for locking the first mounting bracket to the second mounting bracket is 90 degrees; the surface on the side of the spanner facing the fixed end comprises two first convex surfaces and two first concave surfaces, and the two first convex surfaces and the two first concave surface are set alternately; and the surface on the side of the fixed end facing the spanner comprises two second convex surfaces and two second concave surfaces, and the two second convex surfaces and the two second concave surfaces are set alternately.

3. The display mounting support according to claim 2, wherein the threaded rod comprises the head portion, a cylindrical portion, a flattened portion and a screwed portion sequentially connected; the spanner is sleeved onto the cylindrical portion; the fixed end, the first mounting bracket and the second mounting bracket are sleeved onto the flattened portion; and the nut is sleeved to the screwed portion.

4. The display mounting support according to claim 3, wherein the first mounting bracket comprises two first sidewalls opposite to each other and a connecting tube connected between the two first sidewalls; two opposite openings of the connecting tube both have flat shapes; the first sidewall defines a first connecting hole which is spaced apart from the opening of the connecting tube; the second mounting bracket comprises a second bracket body and at least one second sidewall; the at least one second sidewall is connected to the second bracket body; the second sidewall defines an arcuate hole and a second connecting hole spaced apart in a height direction of the display mounting support; the arcuate hole corresponds to the opening of the connecting tube, and the first connecting hole corresponds to the second connecting hole, and the flattened portion passes through the arcuate hole and the connecting tube, the flattened portion is shaped to cooperate with the flattened opening of the connecting tube to achieve an anti-rotation connection; and the first connecting hole and the second connecting hole are positioned opposite each other and are pivotably connected.

5. The display mounting support according to claim 4, wherein the first mounting bracket comprises at least one mounting arm; the at least one mounting arm is arranged along the height direction; and an end of the connecting arm is connected to the at least one mounting arm.

6. The display mounting support according to claim 5, wherein the first mounting bracket further comprises a first bracket body, the first bracket body is connected between the two first sidewalls, and the at least one mounting arm is connected to the first bracket body and/or the at least one first sidewall.

7. The display mounting support according to claim 6, wherein the at least one mounting arm is located below the connecting tube, and the mounting arm is bent from first bracket body.

8. The display mounting support according to claim 1, wherein the second mounting bracket further comprises a second bracket body; the display mounting support further comprises a hook and a connecting member both located on a side of the mounting frame facing the connecting arm; the hook is suspended on a top end of the second bracket body; and the connecting member is connected to a bottom end of the second bracket body.

9. The display mounting support according to claim 8, wherein the top end of the second bracket body comprises a hanging portion; a bottom end of the second bracket body defines a connecting groove; the hook cooperates with the hanging portion; and the connecting member passes through the connecting groove to securely connect the second bracket body to the mounting frame.

10. The display mounting support according to claim 9, wherein the hanging portion is an arc curved downwardly at two ends, and the connecting groove is an arc curved upwardly at two ends.

11. The display mounting support according to claim 10, wherein the hook is also an arc curved upwardly at two ends, and the arc of the connecting groove is co-centered with the arc of the hook.

12. The display mounting support according to claim 8, wherein the connecting member comprises a safety member, an elastic member and a sliding seat; the sliding seat is connected to the mounting frame; one side of the sliding seat facing the mounting frame is recessed to form an up-down sliding space; the safety member is inserted into the sliding space; one end of the elastic member is connected to the sliding seat and the other end of the elastic member is connected to the safety member; and a top end of the safety member forms a hook portion.

13. The display mounting support according to claim 12, wherein an inner wall of the sliding seat is protruded with a resisting post; the safety member defines a receiving groove; the resisting post is inserted into the receiving groove; and one end of the elastic member is abutted against or connected to a top wall of the receiving groove, and the other end of the elastic member is abutted against or connected to the resisting post.

14. The display mounting support according to claim 13, wherein a bottom wall of the resisting post is a curved wall, a bottom wall of the receiving groove is also a curved wall, and the bottom wall of the resisting post abuts against the bottom wall of the receiving groove; and/or a top wall of the resisting post is a planar wall and a top wall of the receiving groove is correspondingly a planar wall.

15. The display mounting support according to claim 14, wherein a bottom end of the safety member is L-shaped to form an operating end.

16. A display mounting support, wherein the display mounting support comprises a wall plate, a connecting arm, a tilt adjustment assembly, and a mounting frame; the connecting arm is connected between the wall plate and one side of the tilt adjustment assembly, and the other side of the tilt adjustment assembly is connected to the mounting frame; one side of the mounting frame away from the tilt adjustment assembly is configured for mounting a display screen; the tilt adjustment assembly comprises a first mounting bracket, a second mounting bracket and a locking member; the first mounting bracket is rotatably connected to the connecting arm; the second mounting bracket is connected to the mounting frame; the locking member is connected between the first mounting bracket and the second mounting bracket; rotating the second mounting bracket relative to the first mounting bracket is capable of adjusting a pitch tilt angle of the second mounting bracket relative to the first mounting bracket; rotating the locking member is capable of locking the first mounting bracket to the second mounting bracket; the second mounting bracket further comprises a second bracket body; the display mounting support further comprises a hook and a connecting member both located on a side of the mounting frame facing the connecting arm; the hook is suspended on a top end of the second bracket body; the connecting member is connected to a bottom end of the second bracket body; the connecting member comprises a safety member, an elastic member and a sliding seat; the sliding seat is connected to the mounting frame; one side of the sliding seat facing the mounting frame is recessed to form an up-down sliding space; the safety member is inserted into the sliding space; one end of the elastic member is connected to the sliding seat and the other end of the elastic member is connected to the safety member; and a top end of the safety member forms a hook portion for engaging with the bottom end of the second bracket body.

17. The display mounting support according to claim 16, wherein an inner wall of the sliding seat is protruded with a resisting post; the safety member defines a receiving groove; the resisting post is inserted into the receiving groove; and one end of the elastic member is abutted against or connected to a top wall of the receiving groove, and the other end of the elastic member is abutted against or connected to the resisting post.

18. The display mounting support according to claim 17, wherein a bottom wall of the resisting post is a curved wall, a bottom wall of the receiving groove is also a curved wall, and the bottom wall of the resisting post abuts against the bottom wall of the receiving groove; and/or a top wall of the resisting post is a planar wall and a top wall of the receiving groove is correspondingly a planar wall.

19. The display mounting support according to claim 16, wherein the locking member comprises a threaded rod, a spanner, a fixed end and a nut; the threaded rod is threaded with the nut; between a head portion of the threaded rod and the nut, the threaded rod is sleeved with the spanner, the fixed end, the first mounting bracket and the second mounting bracket; the threaded rod is rotatably connected with the spanner; the threaded rod and fixed end are anti-rotation connected; a surface on a side of the spanner facing the fixed end comprises a first convex surface and a first concave surface, and a surface on a side of the fixed end facing the spanner comprises a second convex surface and a second concave surface; when the spanner is rotated relative to the threaded rod such that the first convex surface abuts against the second convex surface, the first mounting bracket and the second mounting bracket are locked and cannot rotate relative to each other; and when the spanner is rotated relative to the threaded rod such that the first convex surface abuts against the second concave surface, and the second convex surface abuts against the first concave surface, the first mounting bracket and the second mounting bracket are not locked, and can rotate relative to each other.

20. A display mounting support, wherein the display mounting support comprises a wall plate, a connecting arm, a tilt adjustment assembly, and a mounting frame; the connecting arm is connected between the wall plate and one side of the tilt adjustment assembly, and the other side of the tilt adjustment assembly is connected to the mounting frame; one side of the mounting frame away from the tilt adjustment assembly is configured for mounting a display screen; the tilt adjustment assembly comprises a first mounting bracket, a second mounting bracket and a locking member; the first mounting bracket is rotatably connected to the connecting arm; the second mounting bracket is connected to the mounting frame; the locking member is connected between the first mounting bracket and the second mounting bracket; rotating the second mounting bracket relative to the first mounting bracket is capable of adjusting a pitch tilt angle of the second mounting bracket relative to the first mounting bracket; rotating the locking member is capable of locking the first mounting bracket to the second mounting bracket, and a rotating angle of the locking member for locking the first mounting bracket to the second mounting bracket is less than or equal to 180 degrees; the second mounting bracket further comprises a second bracket body; the display mounting support further comprises a hook and a connecting member both located on a side of the mounting frame facing the connecting arm; the hook is suspended on a top end of the second bracket body; and the connecting member is connected to a bottom end of the second bracket body; wherein the connecting member comprises a safety member, an elastic member and a sliding seat; the sliding seat is connected to the mounting frame; one side of the sliding seat facing the mounting frame is recessed to form an up-down sliding space; the safety member is inserted into the sliding space; one end of the elastic member is connected to the sliding seat and the other end of the elastic member is connected to the safety member; and a top end of the safety member forms a hook portion.

* * * * *